(12) United States Patent
Smith et al.

(10) Patent No.: US 9,838,736 B2
(45) Date of Patent: Dec. 5, 2017

(54) HOME AUTOMATION BUBBLE ARCHITECTURE

(71) Applicant: EchoStar Technologies L.L.C., Englewood, CO (US)

(72) Inventors: George Horkan Smith, Atlanta, GA (US); Eric Holley, Atlanta, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 393 days.

(21) Appl. No.: 14/565,853

(22) Filed: Dec. 10, 2014

(65) Prior Publication Data
US 2015/0160634 A1 Jun. 11, 2015

Related U.S. Application Data

(60) Provisional application No. 61/914,856, filed on Dec. 11, 2013.

(51) Int. Cl.
*H04N 21/436* (2011.01)
*G05B 11/01* (2006.01)
(Continued)

(52) U.S. Cl.
CPC ....... *H04N 21/43615* (2013.01); *G05B 11/01* (2013.01); *G05B 15/02* (2013.01);
(Continued)

(58) Field of Classification Search
CPC .. H04N 21/43615; G05B 11/01; G05B 15/02; G05D 7/0676; G07C 9/00571; G10L 17/22
(Continued)

(56) References Cited

U.S. PATENT DOCUMENTS

| 4,127,966 A | 12/1978 | Schmidt |
| 4,386,436 A | 5/1983 | Kocher et al. |

(Continued)

FOREIGN PATENT DOCUMENTS

| CA | 2 267 988 A1 | 4/1998 |
| CN | 105814555 A | 7/2016 |

(Continued)

OTHER PUBLICATIONS

Author Unknown, "Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.

(Continued)

*Primary Examiner* — Sean Shechtman
*Assistant Examiner* — Michael W Choi
(74) *Attorney, Agent, or Firm* — Kilpatrick Townsend & Stockton LLP

(57) ABSTRACT

Systems and methods for controlling a plurality of devices in a home automation system may include providing a device proxy for a device connected to the home automation system and setting a new value in a value box of the device proxy, whereby the value box corresponds to at least one of a sensor, control, and metadata of the device. The systems and methods may further include determining one or more rules associated with the device proxy and running the determined one or more rules, whereby the determined one or more rules are indicative of interactive relationships between the device proxy and one or more other device proxies corresponding to one or more other devices connected to the home automation system.

19 Claims, 10 Drawing Sheets

(51) Int. Cl.
| | |
|---|---|
| *H04L 12/28* | (2006.01) |
| *G05B 15/02* | (2006.01) |
| *H04N 21/235* | (2011.01) |
| *H04N 21/41* | (2011.01) |
| *H04N 21/435* | (2011.01) |
| *H04N 21/4363* | (2011.01) |
| *H04N 21/45* | (2011.01) |
| *H04N 21/454* | (2011.01) |
| *G10L 17/22* | (2013.01) |
| *H04N 21/426* | (2011.01) |
| *H04N 21/472* | (2011.01) |
| *H04N 21/478* | (2011.01) |
| *H04N 21/61* | (2011.01) |
| *G07C 9/00* | (2006.01) |
| *H04N 21/422* | (2011.01) |
| *E05B 47/00* | (2006.01) |

(52) U.S. Cl.
CPC ......... *G07C 9/00571* (2013.01); *G10L 17/22* (2013.01); *H04L 12/2803* (2013.01); *H04L 12/2816* (2013.01); *H04L 12/2825* (2013.01); *H04L 12/2838* (2013.01); *H04N 21/235* (2013.01); *H04N 21/4126* (2013.01); *H04N 21/4131* (2013.01); *H04N 21/422* (2013.01); *H04N 21/4263* (2013.01); *H04N 21/42202* (2013.01); *H04N 21/435* (2013.01); *H04N 21/43637* (2013.01); *H04N 21/454* (2013.01); *H04N 21/4532* (2013.01); *H04N 21/478* (2013.01); *H04N 21/47217* (2013.01); *H04N 21/6143* (2013.01); *E05B 2047/0068* (2013.01); *E05B 2047/0069* (2013.01); *E05B 2047/0094* (2013.01); *G05B 2219/2642* (2013.01); *G07C 2209/62* (2013.01); *Y10T 292/096* (2015.04)

(58) Field of Classification Search
USPC .......................................................... 700/90
See application file for complete search history.

(56) References Cited

U.S. PATENT DOCUMENTS

| | | | |
|---|---|---|---|
| 4,581,606 A | 4/1986 | Mallory | |
| 4,694,607 A | 9/1987 | Ishida et al. | |
| 4,728,949 A | 3/1988 | Platte et al. | |
| 4,959,713 A | 9/1990 | Morotomi et al. | |
| 5,400,246 A | 3/1995 | Wilson et al. | |
| 5,770,896 A | 6/1998 | Nakajima | |
| 5,805,442 A | 9/1998 | Crater et al. | |
| 5,822,012 A | 10/1998 | Jeon et al. | |
| 5,894,331 A | 4/1999 | Yang | |
| 5,926,090 A | 7/1999 | Taylor et al. | |
| 5,970,030 A | 10/1999 | Dimitri et al. | |
| 6,081,758 A | 6/2000 | Parvulescu | |
| 6,104,334 A | 8/2000 | Allport | |
| 6,107,918 A | 8/2000 | Klein et al. | |
| 6,107,935 A | 8/2000 | Comerford et al. | |
| 6,119,088 A | 9/2000 | Ciluffo | |
| 6,182,094 B1 | 1/2001 | Humpleman et al. | |
| 6,225,938 B1 | 5/2001 | Hayes et al. | |
| 6,286,764 B1 | 9/2001 | Garvey et al. | |
| 6,330,621 B1 | 12/2001 | Bakke et al. | |
| 6,337,899 B1 | 1/2002 | Alcendor et al. | |
| 6,377,858 B1 | 4/2002 | Koeppe | |
| 6,405,284 B1 | 6/2002 | Bridge | |
| 6,415,257 B1 | 7/2002 | Junqua et al. | |
| 6,502,166 B1 | 12/2002 | Cassidy | |
| 6,529,230 B1 | 3/2003 | Chong | |
| 6,543,051 B1 | 4/2003 | Manson et al. | |
| 6,553,375 B1 | 4/2003 | Huang et al. | |
| 6,646,676 B1 | 11/2003 | DaGraca et al. | |
| 6,662,282 B2 | 12/2003 | Cochran | |
| 6,744,771 B1* | 6/2004 | Barber ................. | G08B 25/08 370/400 |
| 6,748,343 B2 | 6/2004 | Alexander et al. | |
| 6,751,657 B1 | 6/2004 | Zothner | |
| 6,756,998 B1 | 6/2004 | Bilger | |
| 6,876,889 B1 | 4/2005 | Lortz et al. | |
| 6,891,838 B1 | 5/2005 | Petite et al. | |
| 6,931,104 B1 | 8/2005 | Foster et al. | |
| 6,976,187 B2 | 12/2005 | Arnott et al. | |
| 6,989,731 B1 | 1/2006 | Kawai et al. | |
| 7,009,528 B2 | 3/2006 | Griep | |
| 7,010,332 B1 | 3/2006 | Irvin et al. | |
| 7,088,238 B2 | 8/2006 | Karaoguz et al. | |
| 7,103,545 B2 | 9/2006 | Furuta | |
| 7,143,298 B2 | 11/2006 | Wells et al. | |
| 7,234,074 B2 | 6/2007 | Cohn et al. | |
| 7,260,538 B2 | 8/2007 | Calderone et al. | |
| 7,346,917 B2 | 3/2008 | Gatto et al. | |
| 7,372,370 B2 | 5/2008 | Stults et al. | |
| 7,386,666 B1 | 6/2008 | Beauchamp et al. | |
| 7,391,319 B1 | 6/2008 | Walker | |
| 7,395,369 B2 | 7/2008 | Sepez et al. | |
| 7,395,546 B1 | 7/2008 | Asmussen | |
| 7,529,677 B1 | 5/2009 | Wittenberg | |
| 7,574,494 B1 | 8/2009 | Mayernick et al. | |
| 7,579,945 B1 | 8/2009 | Richter et al. | |
| 7,590,703 B2 | 9/2009 | Cashman et al. | |
| 7,640,351 B2 | 12/2009 | Reckamp et al. | |
| 7,659,814 B2 | 2/2010 | Chen et al. | |
| 7,694,005 B2 | 4/2010 | Reckamp et al. | |
| 7,739,718 B1 | 6/2010 | Young et al. | |
| 7,861,034 B2 | 12/2010 | Yamamoto et al. | |
| 7,870,232 B2 | 1/2011 | Reckamp et al. | |
| 7,945,297 B2 | 5/2011 | Philipp | |
| 7,969,318 B2 | 6/2011 | White et al. | |
| 8,013,730 B2 | 9/2011 | Oh et al. | |
| 8,042,048 B2 | 10/2011 | Wilson et al. | |
| 8,086,757 B2 | 12/2011 | Chang | |
| 8,106,768 B2 | 1/2012 | Neumann | |
| 8,156,368 B2 | 4/2012 | Chambliss et al. | |
| 8,171,148 B2 | 5/2012 | Lucas et al. | |
| 8,180,735 B2 | 5/2012 | Ansari et al. | |
| 8,201,261 B2 | 6/2012 | Barfield et al. | |
| 8,221,290 B2 | 7/2012 | Vincent et al. | |
| 8,275,143 B2 | 9/2012 | Johnson | |
| 8,289,157 B2 | 10/2012 | Patenaude et al. | |
| 8,290,545 B2 | 10/2012 | Terlizzi | |
| 8,310,335 B2 | 11/2012 | Sivakkolundhu | |
| 8,316,413 B2 | 11/2012 | Crabtree | |
| 8,320,578 B2 | 11/2012 | Kahn et al. | |
| 8,335,312 B2 | 12/2012 | Gerhardt et al. | |
| 8,413,204 B2 | 4/2013 | White et al. | |
| 8,436,902 B2 | 5/2013 | Kuehnle | |
| 8,498,572 B1 | 7/2013 | Schooley et al. | |
| 8,516,087 B2 | 8/2013 | Wilson et al. | |
| 8,539,567 B1 | 9/2013 | Logue et al. | |
| 8,550,368 B2 | 10/2013 | Butler et al. | |
| 8,619,136 B2 | 12/2013 | Howarter et al. | |
| 8,620,841 B1 | 12/2013 | Filson et al. | |
| 8,644,525 B2 | 2/2014 | Bathurst et al. | |
| 8,645,327 B2 | 2/2014 | Falkenburg et al. | |
| 8,667,529 B2 | 3/2014 | Taxier | |
| 8,750,576 B2 | 6/2014 | Huang et al. | |
| 8,780,201 B1 | 7/2014 | Scalisi et al. | |
| 8,786,698 B2 | 7/2014 | Chen et al. | |
| 8,799,413 B2 | 8/2014 | Taylor et al. | |
| 8,898,709 B2 | 11/2014 | Crabtree | |
| 8,923,823 B1 | 12/2014 | Wilde | |
| 8,930,700 B2 | 1/2015 | Wielopolski | |
| 8,965,170 B1 | 2/2015 | Benea et al. | |
| 9,019,111 B1 | 4/2015 | Sloo et al. | |
| 9,049,567 B2 | 6/2015 | Le Guen et al. | |
| 9,191,804 B1 | 11/2015 | Paczkowski et al. | |
| 9,246,921 B1 | 1/2016 | Vlaminck et al. | |
| 9,258,593 B1* | 2/2016 | Chen ................. | H04N 21/43615 |
| 9,443,142 B2 | 9/2016 | Reynolds, Jr. | |
| 9,462,041 B1 | 10/2016 | Hagins et al. | |
| 9,495,860 B2 | 11/2016 | Lett | |

(56) References Cited

U.S. PATENT DOCUMENTS

| | | |
|---|---|---|
| 9,511,259 B2 | 12/2016 | Mountain |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1* | 1/2008 | Lee ............... H04L 12/66 370/467 |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0069038 A1 | 3/2009 | Olague et al. |
| 2009/0083374 A1* | 3/2009 | Saint Clair ............ G05B 15/00 709/203 |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1 | 9/2009 | Armstrong |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0307715 A1 | 12/2009 | Santamaria et al. |
| 2010/0031286 A1 | 2/2010 | Gupta et al. |
| 2010/0045471 A1 | 2/2010 | Meyers |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0164732 A1 | 7/2010 | Wedig et al. |
| 2010/0211546 A1 | 8/2010 | Grohman et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0270549 A1 | 11/2011 | Jeansonne et al. |
| 2011/0282837 A1 | 11/2011 | Gounares et al. |
| 2011/0283311 A1 | 11/2011 | Luong |
| 2011/0285528 A1 | 11/2011 | Weinstein et al. |
| 2011/0295396 A1 | 12/2011 | Chinen et al. |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1* | 12/2012 | Singh ................ H04L 65/1069 370/401 |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |

(56) References Cited

U.S. PATENT DOCUMENTS

| | | |
|---|---|---|
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0247117 A1 | 9/2013 | Yamada et al. |
| 2013/0267383 A1 | 10/2013 | Watterson |
| 2013/0278828 A1 | 10/2013 | Todd |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2014/0025798 A1 | 1/2014 | Apte et al. |
| 2014/0028546 A1 | 1/2014 | Jeon et al. |
| 2014/0095684 A1 | 4/2014 | Nonaka et al. |
| 2014/0101465 A1 | 4/2014 | Wang et al. |
| 2014/0135993 A1 | 5/2014 | Kang et al. |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0218517 A1 | 8/2014 | Kim et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0310075 A1 | 10/2014 | Ricci |
| 2014/0313014 A1 | 10/2014 | Huh et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0106866 A1 | 4/2015 | Fujita |
| 2015/0113571 A1 | 4/2015 | Cholas et al. |
| 2015/0127712 A1 | 5/2015 | Fadell et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160635 A1 | 6/2015 | Schofield et al. |
| 2015/0160636 A1 | 6/2015 | McCarthy et al. |
| 2015/0160663 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0192914 A1 | 7/2015 | Slupik |
| 2015/0198941 A1 | 7/2015 | Pederson |
| 2015/0241860 A1 | 8/2015 | Raid |
| 2015/0281824 A1 | 10/2015 | Nguyen et al. |
| 2015/0309487 A1 | 10/2015 | Lyman |
| 2015/0325096 A1 | 11/2015 | Hatch |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0191912 A1 | 6/2016 | Lea et al. |
| 2016/0191990 A1 | 6/2016 | McCarthy |
| 2016/0203700 A1 | 7/2016 | Bruhn et al. |
| 2016/0234034 A1 | 8/2016 | Mahar et al. |
| 2016/0256485 A1 | 9/2016 | Wager et al. |
| 2016/0260135 A1 | 9/2016 | Zomet et al. |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0006533 A1 | 1/2017 | Gould et al. |
| 2017/0041886 A1 | 2/2017 | Baker et al. |
| 2017/0048476 A1 | 2/2017 | Freiin von Kapri et al. |
| 2017/0054615 A1 | 2/2017 | Wilson |
| 2017/0127124 A9 | 5/2017 | Wilson et al. |
| 2017/0146964 A1 | 5/2017 | Beals |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |

OTHER PUBLICATIONS

Author Unknown, "AllJoyn Onboarding Service Frameworks," Qualcomm Connected Experiences, Inc., accessed on Jul. 15, 2014, 9 pages. Retrieved from https://www.alljoyn.org.

Author Unknown, "App for Samsung Smart TV®," Crestron Electronics, Inc., accessed on Jul. 14, 2014, 3 pages. Retrieved from http://www.crestron.com/products/smart tv television apps/.

Author Unknown, "Do you want to know how to find water leaks?

(56) References Cited

OTHER PUBLICATIONS

Use a Bravedo Water Alert Flow Monitor to find out!", Bravedo. com, accessed Dec. 16, 2014, 10 pages. Retrieved from http://bravedo.com/.
Author Unknown, "Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
Author Unknown, "International Building Code Excerpts, Updated with recent code changes that impact electromagnetic locks," Securitron, Assa Abloy, 2007, 2009,2 pages.Retrieved from: www.securitron.com/Other/.../New_IBC-IFC_Code_Language.pdf.
Author Unknown, "Introduction to Ultrasonic Doppler Flowmeters," OMEGA Engineering inc., accessed on Dec. 16, 2014, 3 pages. Retrieved from http://www.omega.com/prodinfo/ultrasonicflowmeters.html.
Author Unknown, "Ultrasonic Flow Meters," RS Hydro Ltd, accessed on Dec. 16, 2014, 3 pages. Retrieved from http://www.rshydro.co.uk/ultrasonic-flowmeter.shtml.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
International Search Report and Written Opinion for PCT/US2014/055476 dated Dec. 30, 2014, 11 pages.
International Search Report and Written Opinion of PCT/EP2011/051608 dated May 30, 2011, 13 pages.
International Preliminary Report on Patentability for PCT/EP2011/051608 dated Aug. 16, 2012, 8 pages.
The Office Action dated Dec. 16, 2013 for Mexican Patent Application No. MX/a/2012/008882 is not translated into English. This document is from prosecution of the corresponding foreign matter for which we do not have a translation, 3 pages.
International Search Report and Written Opinion of PCT/US2014/053876 dated Nov. 26, 2014, 15 pages.
International Search Report and Written Opinion of PCT/US2014/055441 dated Dec. 4, 2014, 10 pages.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.
U.S. Appl. No. 12/700,310, filed Feb. 4, 2010, Office Action dated May 4, 2012, 15 pages.
U.S. Appl. No. 12/700,310, filed Feb. 4, 2010, Final Office Action dated Oct. 10, 2012, 16 pages.
U.S. Appl. No. 12/700,310, filed Feb. 4, 2010, Non-Final Office Action dated Apr. 1, 2013, 16 pages.
U.S. Appl. No. 12/700,310, filed Feb. 4, 2010, Non-Final Office Action dated Oct. 15, 2013, 15 pages.
U.S. Appl. No. 12/700,310, filed Feb. 4, 2010, Final Office Action dated Feb. 28, 2014, 17 pages.
U.S. Appl. No. 12/700,310, filed Feb. 4, 2010, Non-Final Office Action dated Aug. 14, 2014, 18 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, CongNotice of Allowance dated Apr. 30, 2014, 9 pages.
U.S. Appl. No. 13/680,934, filed Nov. 19, 2012, Notice of Allowance dated Jul. 25, 2014, 12 pages.
International Search Report and Written Opinion for PCT/US2016/028126 dated Jun. 3, 2016, all pages.
U.S. Appl. No. 12/700,310, filed Feb. 4, 2010 Non-Final Office Action dated Jun. 16, 2016, 30 pages.
U.S. Appl. No. 14/528,739, filed Oct. 30, 2014 Notice of Allowance dated Jun. 23, 2016, 34 pages.
U.S. Appl. No. 14/485,188, filed Sep. 12, 2014, Non-Final Rejection dated Jun. 17, 2016, 29 pages.
U.S. Appl. No. 14/710,331, filed May 12, 2015 Non-Final Rejection dated May 20, 2016, 42 pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
U.S. Appl. No. 14/710,331, filed May 12, 2015, Non-Final Rejection dated May 20, 2016, 42 pages.
International Preliminary Report on Patentability for PCT/US2014/055476 dated Jun. 14, 2016, 9 pages.
U.S. Appl. No. 14/107,132, filed Dec. 16, 2013, Non Final Office Action dated May 27, 2015, 26 pages.
Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-843-3, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
U.S. Appl. No. 14/470,352, filed Aug. 27, 2014 Non Final Office Action dated Nov. 20, 2015, 28 pages.
International Search Report and Written Opinion for PCT/GB2015/052457 dated Nov. 13, 2015, 11 pages.
U.S. Appl. No. 12/700,310, filed Feb. 4, 2010 Final Office Action dated Oct. 26, 2015, 19 pages.
U.S. Appl. No. 14/107,132, filed Dec. 16, 2013, Final Rejection dated Dec. 16, 2015, 32 pages.
U.S. Appl. No. 14/470,352, filed Aug. 27, 2014 Notice of Allowance dated Dec. 2, 2016, all pages.
U.S. Appl. No. 15/050,958, filed Feb. 23, 2016 Notice of Allowance dated Dec. 6, 2016, all pages.
U.S. Appl. No. 15/289,395, filed Oct. 10, 2016 Non-Final Rejection dated Dec. 2, 2016, all pages.
U.S. Appl. No. 14/107,132, filed Dec. 16, 2013 Notice of Allowance dated Jan. 18, 2017, all pages.
U.S. Appl. No. 14/485,188, filed Sep. 12, 2014, Final Rejection dated Nov. 25, 2016, 22 pages.
U.S. Appl. No. 14/577,717, filed Dec. 19, 2014, Final Office Action dated Dec. 19, 2016, all pages.
U.S. Appl. No. 14/567,783, filed Dec. 11, 2014, Final Rejection dated Dec. 20, 2016, all pages.
U.S. Appl. No. 15/075,412, filed Mar. 21, 2016, Non Final Rejection dated Dec. 21, 2016, all pages.
U.S. Appl. No. 14/485,188, filed Sep. 12, 2014, Pre-Interview First Office Action dated Jul. 29, 2015, 20 pages.
U.S. Appl. No. 14/485,188, filed Sep. 12, 2014, Pre-Interview First Office Action dated Oct. 1, 2015, 10 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
U.S. Appl. No. 14/485,188, filed Sep. 12, 2014, Final Rejection dated Feb. 23, 2016, 22 pages.
U.S. Appl. No. 14/567,348, filed Dec. 11, 2014, Preinterview first office action dated Jan. 20, 2016, 23 pages.
Mexican Institute of Industrial Property Office Action dated Nov. 1, 2013, for Mex. Patent Appln No. MX/a/2012/008882 is not translated into English, 3 pages
Mexican Institute of Industrial Property Notice of Allowance dated Feb. 10, 2014, for Mex. Patent Appln No. MX/a/2012/008882, 1 page.

(56) References Cited

OTHER PUBLICATIONS

Wang et al., "Mixed Sound Event Verification on Wireless Sensor Network for Home Automation," IEEE Transactions on Industrial Informatics, vol. 10, No. 1, Feb. 2014, 10 pages.
U.S. Appl. No. 12/700,310, filed Feb. 4, 2010 Non-Final Office Action dated Mar. 11, 2015, 35 pages.
U.S. Appl. No. 12/700,310, filed Feb. 4, 2010 Notice of Allowance dated Nov. 8, 2016, all pages.
U.S. Appl. No. 14/584,075, filed Dec. 29, 2014, Final Rejection dated Oct. 6, 2016, all pages.
U.S. Appl. No. 14/567,765, filed Dec. 11, 2014, First Action interview dated Oct. 18, 2016, all pages.
U.S. Appl. No. 14/566,977, filed Dec. 11, 2014, Non Final Rejection dated Oct. 3, 2016, all pages.
U.S. Appl. No. 14/567,754, filed Dec. 11, 2014, Non Final Rejection dated Nov. 4, 2016, all pages.
U.S. Appl. No. 14/567,770, filed Dec. 11, 2014, Non Final Rejection dated Nov. 4, 2016, all pages.
U.S. Appl. No. 14/671,299, filed Mar. 27, 2015, Non Final Rejection dated Oct. 28, 2016, all pages.
U.S. Appl. No. 14/476,377, filed Sep. 3, 2014, Non-Final Rejection dated Nov. 7, 2016, all pages.
Office Action for EP14868928.4 dated Sep. 23, 2016, all pages.
U.S. Appl. No. 14/470,352, filed Aug. 27, 2014 Non Final Office Action dated Aug. 26, 2016, all pages.
U.S. Appl. No. 14/107,132, filed Dec. 16, 2013, Non Final Office Action dated Jul. 18, 2016, all pages.
U.S. Appl. No. 14/715,248, filed May 18, 2015, Non-Final Rejection dated Jul. 19, 2016, 34 pages.
U.S. Appl. No. 14/567,783, filed Dec. 11, 2014, Non Final Rejection dated Aug. 23, 2016, all pages.
U.S. Appl. No. 14/470,352, filed Aug. 27, 2014 Final Office Action dated Mar. 17, 2016, all pages.
U.S. Appl. No. 14/567,765, filed Dec. 11, 2014, Preinterview first office action dated Apr. 8, 2016, 30 pages.
U.S. Appl. No. 14/577,717, filed Dec. 19, 2014, Preinterview first office action dated Apr. 4, 2016, 29 pages.
U.S. Appl. No. 14/584,075, filed Dec. 29, 2014, Non-Final Rejection dated Apr. 1, 2016, 40 pages.
International Preliminary Report on Patentability for PCT/GB2015/052544 dated Mar. 7, 2017, all pages.
International Search Report and Written Opinion for PCT/US2016/057729 dated Mar. 28, 2017, all pages.
European Search Report for EP 16 20 0422 dated Jan. 13, 2017, all pages.

BDEJONG_CREE, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/567,765, filed Dec. 11, 2014, Final Rejection dated Feb. 16, 2017, all pages.
U.S. Appl. No. 14/485,038, filed Sep. 12, 2014, Non Final Rejection dated Apr. 6, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/671,299, filed Mar. 27, 2015, Notice of Allowance dated Apr. 17, 2017, all pages.
U.S. Appl. No. 15/075,412, filed Mar. 21, 2016, Final Rejection dated Apr. 17, 2017, all pages.
U.S. Appl. No. 14/497,130, filed Sep. 25, 2014, Non Final Rejection dated Feb. 8, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
U.S. Appl. No. 14/485,188, filed Sep. 12, 2014, Non-Final Rejection dated Apr. 19, 2017, all pages.
Notification of Publication of European Application No. 162004220 as EP 3166308 on May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.

* cited by examiner

HOME AUTOMATION BUBBLE ARCHITECTURE

CROSS-REFERENCES TO RELATED APPLICATIONS

This application claims priority to U.S. Provisional Patent Application No. 61/914,856, filed on Dec. 11, 2013, and entitled, "METHODS AND SYSTEMS FOR HOME AUTOMATION," the entire contents of which are incorporated herein by reference.

BACKGROUND

Home automation systems are becoming increasingly prevalent. Such systems may incorporate a variety of electronic devices, such as "smart" electronics, which allow end-users to control and/or view status information of those devices, and non-smart electronics. Among the variety of different electronic devices, various different communication standards exist. It is desirable to integrate all of the variety of electronic devices and their various communication standards together to operate coherently in a home automation system. This disclosure is intended to address these issues and to provide related advantages.

SUMMARY

In one aspect, a method for controlling a plurality of devices in a home automation system may comprise providing, by a home automation controller, a device proxy for a device connected to the home automation system, and setting, by the home automation controller, a new value in a value box of the device proxy, wherein the value box corresponds to at least one of a sensor, control, and metadata of the device. The method may further comprise determining, by the home automation controller, one or more rules associated with the device proxy, and running, by the home automation controller, the determined one or more rules, wherein the determined one or more rules are indicative of interactive relationships between the device proxy and one or more other device proxies corresponding to one or more other devices connected to the home automation system.

Various embodiments of the present method may include one or more of the following features. The device proxy may comprise a plurality of value boxes corresponding to a plurality of sensors, controls, and metadata of the device. The home automation controller may comprise a television receiver. The method may comprise connecting, by the home automation controller, the device proxy to a user interface ("UI") device proxy, wherein the UI device proxy may be in operative communication with a UI device to allow for settings to be solicited for and collected via the UI device. The UI device may comprise at least one of a television display screen, an overlay device, a mobile device, a smart wristwatch, and a webpage. The device proxy may be connected to the UI device proxy via the determined one or more rules. Running the determined one or more rules may comprise updating, by the home automation controller, a UI box value of the UI device proxy to mirror the new value provided for in the value box of the device proxy. The method may further comprise relaying, by the home automation controller, a message to the UI device to update a user screen of the UI device based on the updated UI box value. Still further, the method may comprise storing, by the home automation controller, configuration information and control information of each of the plurality of devices in a home automations settings database.

Various other embodiments of the method may include receiving, by the home automation controller, a first setting for the device through a UI device proxy, determining, by the home automation controller, a second device to control based on the determined one or more rules, and after determining the second device to control, automatically sending, by the home automation controller, a reactive setting to a second device proxy associated with the second device. The method may further comprise translating, by the home automation controller, the reactive setting into a protocol-specific action signal associated with a protocol required by the second device and/or sending, by the home automation controller, the translated reactive setting to the second device through a communications network connected to the protocol. The method may comprise initially receiving, by the home automation controller, the determined one or more rules through a UI device proxy, wherein the rule links the first setting of the first device with the reactive setting of the second device. Still further, the method may comprise receiving, by the home automation controller, a feedback signal from the second device through the communications network, wherein the feedback signal indicates a changed state of the second device.

In still other embodiments, the feedback signal may be received at the second device proxy of the home automation controller. The method may further comprise, after receiving the feedback signal from the second device, determining, by the home automation controller, a new value corresponding to the changed state of the second device as indicated by the feedback signal and triggering, by the home automation controller, a mirrored second device proxy associated with the second device to update a current value of the mirrored second device proxy to the new value. The method may comprise determining, by the home automation controller, an additional reactive setting for an additional device proxy of an additional device based on the new value of the mirrored second device proxy and sending, by the home automation controller, the additional device setting to the additional device proxy to change a state of the additional device. Further, the method may comprise detecting, by the home automation controller, a change in at least one of the first and second devices and updating, by the home automation controller, at least one of the first and second device proxies with a new value based on the detected change. The method may further include, wherein detecting the change comprises periodically checking, by the home automation controller, the first and second devices for a health status, an accuracy status, and an up-to-date status.

In another aspect, a system for controlling a plurality of devices in a home automation system may include one or more processors and a memory communicatively coupled with and readable by the one or more processors. The memory may have stored therein processor-readable instructions that when executed by the one or more processors, cause the one or more processors to perform one or more steps. For instance, the processor-readable instructions may cause the one or more processors to provide, by a home automation controller, a device proxy for a device connected to the home automation system and/or set, by the home automation controller, a new value in a value box of the device proxy, wherein the value box corresponds to at least one of a sensor, control, and metadata of the device. The processor-readable instructions may cause the one or more processors to determine, by the home automation controller, one or more rules associated with the device proxy. Further, the processor-readable instructions may cause the one or more processors to run, by the home automation controller, the determined one or more rules, wherein the determined one or more rules are indicative of interactive relationships between the device proxy and one or more other device proxies corresponding to one or more other devices connected to the home automation system.

In yet another aspect, a computer-readable medium may have stored thereon a series of instructions which, when executed by a processor, cause the processor to control a plurality of devices in a home automation system by providing, by a home automation controller, a device proxy for a device connected to the home automation system and/or setting, by the home automation controller, a new value in a value box of the device proxy, wherein the value box corresponds to at least one of a sensor, control, and metadata of the device. The instructions may further cause the processor to control the plurality of devices by determining, by the home automation controller, one or more rules associated with the device proxy, and/or running, by the home automation controller, the determined one or more rules. The determined one or more rules may be indicative of interactive relationships between the device proxy and one or more other device proxies corresponding to one or more other devices connected to the home automation system.

DETAILED DESCRIPTION

In general, the present systems and methods disclosed herein provide for a home automation software architecture, also referred to as a "bubble" or "bubble architecture," that facilitates set-up of rules and actions across a plurality of home automation devices to control such devices concurrently, and/or have such devices turn on or off automatically, for instance, based on various states of other devices and/or sensors. Each home automation device may have varying numbers of controls and/or sensors, such that accessing such controls and sensors varies by device manufacturer and/or particular networks used to access them. This disclosure provides proxies for the devices that may facilitate communication and connection of such devices by acting as the actual device when interacting with a rules engine operating within the home automation bubble. A proxy may include a plurality of boxes that reflect current values of the controls and/or sensors maintained by the proxy. In this way, the systems and methods may present information available to various sensors and controls in a simplified manner that promotes easier rule creation and/or maintenance.

In a further aspect, such proxies may be used not only for physical devices, but also for additional "mirrored" proxies that are created and implemented for a user interface and/or an automatic control interface. For instance, rules in the bubble may associate a device proxy box to its paired mirrored proxy box to achieve a transparent connection of multiple users and devices with a constantly maintained state.

Figure 1:
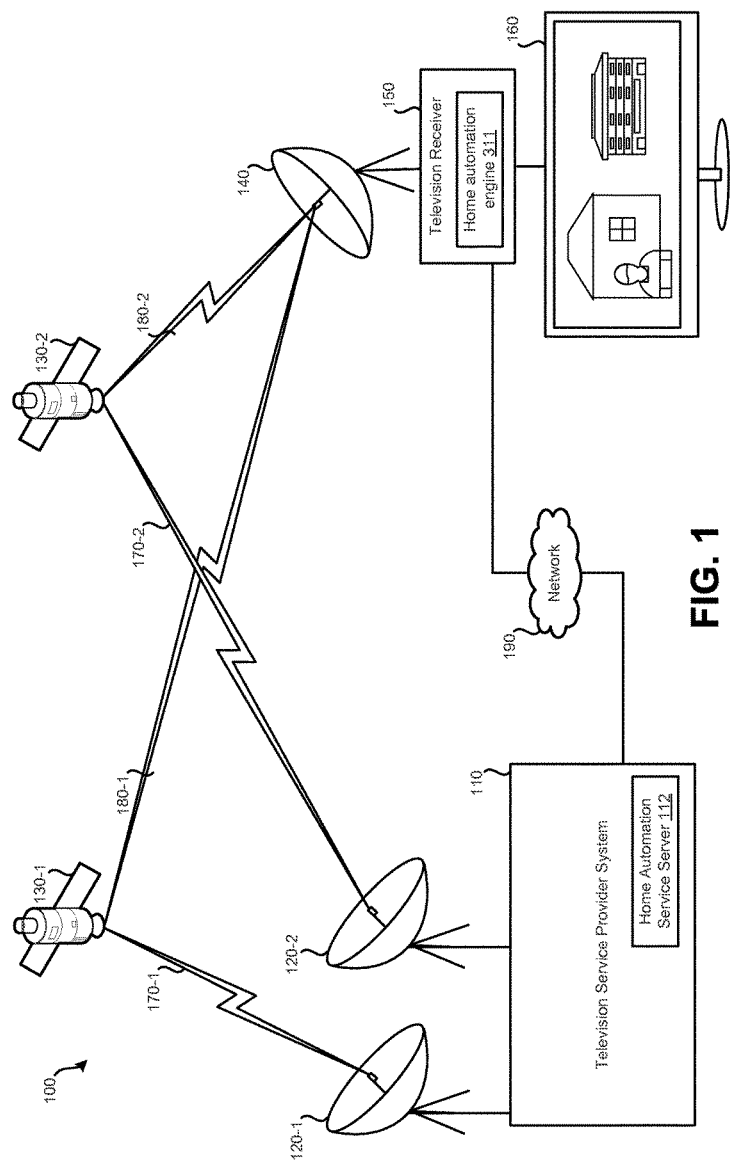
FIG. 1 shows an embodiment of a television service provider system.

FIG. 1 illustrates an embodiment of a satellite television distribution system 100. While a home automation system may be incorporated with various types of television receivers, various embodiments may be part of a satellite-based television distribution system. Cable, IP-based, wireless and broadcast focused systems are also possible. Satellite television distribution system 100 may include: television service provider system 110, satellite transmitter equipment 120, satellites 130, satellite dish 140, television receiver 150, system credit management engine 112, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

As shown in FIG. 1, television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Still referring to FIG. 1, satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may be also be relayed to television receiver via one or more transponder streams. For instance, home automation functions may be requested by and/or pushed to the television receiver 150 from the television service provider system 110.

As shown in FIG. 1, multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Further, it is contemplated that multiple home automation functions may be transmitted in similar fashion.

Still in reference to FIG. 1, Satellite dish 140 may be a piece of user equipment that is used to receive transponder streams from one or more satellites, such as satellites 130. Satellite dish 140 may be provided to a subscriber for use on a subscription basis to receive television channels and/or home automation functions provided by the television service provider system 110 and/or specifically, the home automation service server 112 of the provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time. Merely by way of example, multiple television channels and/or multiple home automation functions may be received concurrently.

Figure 2:
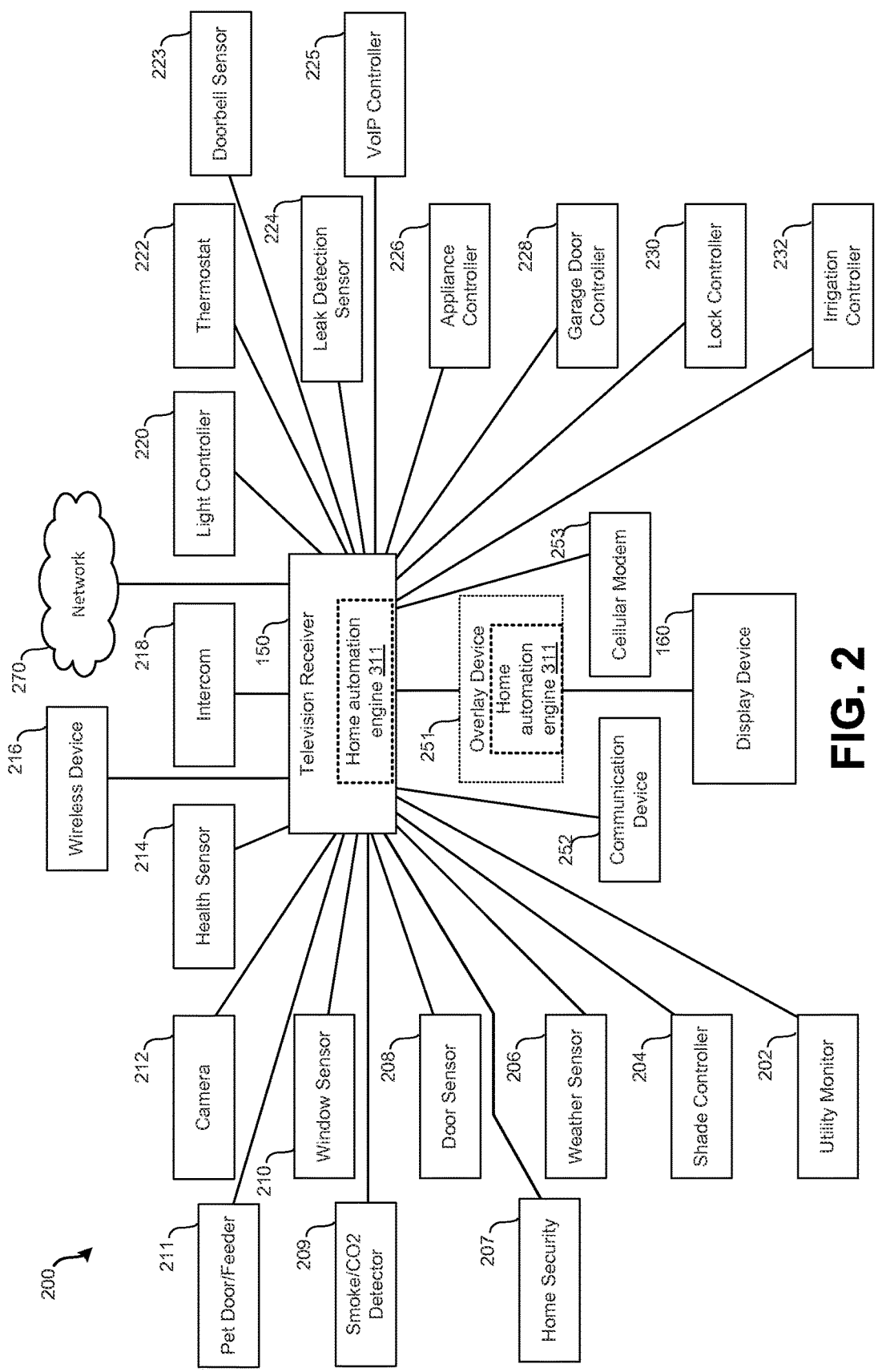
FIG. 2 shows an embodiment of a home automation system hosted by a television receiver.

FIG. 1 further illustrates one or more television receivers in communication with satellite dish 140. Television receivers may be configured to decode signals received from satellites 130 via satellite dish 140 for output and presentation via a display device, such as display device 160. Similarly, such television receivers may decode signals received for any home automation devices. For instance, a home automation engine 311, as described further below, may decode such signals. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 described below provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include the home automation engine 311, as detailed in relation to FIG. 3.

Referring again to FIG. 1, display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

As further illustrated in FIG. 1, uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels and/or home automation functions. For example, uplink signal 170-1 may contain a first group of television channels and/or home automation functions, while uplink signal 170-2 contains a second group of television channels and/or home automation functions. Each of these television channels and/or home automation functions may be scrambled such that unauthorized persons are prevented from accessing the television channels.

As shown in FIG. 1, downlink signal 180-1 represents a signal between satellite 130-1 and satellite dish 140. Downlink signal 180-2 represents a signal between satellite 130-2 and satellite dish 140. Each of the downlink signals 180 may contain one or more different television channels and/or home automation functions, which may be at least partially scrambled. A downlink signal may be in the form of a transponder stream. A single transponder stream may be tuned to at a given time by a tuner of a television receiver. For example, downlink signal 180-1 may be a first transponder stream containing a first group of television channels and/or home automation functions, while downlink signal 180-2 may be a second transponder stream containing a different group of television channels and/or home automation functions. In addition to or instead of containing television channels, a transponder stream can be used to transmit on-demand content to television receivers, including PPV content (which may be stored locally by the television receiver until output for presentation).

FIG. 1 further illustrates downlink signal 180-1 and downlink signal 180-2, being received by satellite dish 140 and distributed to television receiver 150. For a first group of television channels and/or home automation functions, satellite dish 140 may receive downlink signal 180-1 and for a second group of channels and/or home automation functions, downlink signal 180-2 may be received. Television receiver 150 may decode the received transponder streams. As such, depending on which television channels and/or home automation functions are desired to be presented or stored, various transponder streams from various satellites may be received, descrambled, and decoded by television receiver 150.

Further shown in FIG. 1, network 190, which may include the Internet, may allow for bidirectional communication between television receiver 150 and television service provider system 110, such as for home automation related services provided by home automation service server 112. In addition or in alternate to network 190, a telephone (e.g., landline) or cellular connection may be used to enable communication between television receiver 150 and television service provider system 110.

Turning now to FIG. 2, an embodiment of a home automation system 200 hosted by a television receiver is illustrated. Television receiver 150 may represent the television receiver of FIG. 1. While television receiver 150 may be configured to receive television programming from a satellite-based television service provider, it should be understood that in other embodiments, other forms of television service provider networks may be used, such as an IP-based network (e.g., fiber network), a cable based network, a wireless broadcast-based network, etc.

As shown in FIG. 2, television receiver 150 may be configured to communicate with multiple in-home home automation devices. The devices with which television receiver 150 communicates may use different communication standards or protocols. For instance, one or more devices may use a ZigBee® communication protocol while one or more other devices communicate with the television receiver using a Z-Wave® communication protocol. Other forms of wireless communication may be used by devices and the television receiver 150. For instance, television receiver 150 and one or more devices may be configured to communicate using a wireless local area network, which may use a communication protocol such as 802.11.

Referring to FIG. 2, in some embodiments, a separate device may be connected with television receiver 150 to enable communication with home automation devices. For instance, communication device 252 may be attached to television receiver 150. Communication device 252 may be in the form of a dongle. Communication device 252 may be configured to allow for Zigbee®, Z-Wave®, and/or other forms of wireless communication. The communication device may connect with television receiver 150 via a USB port or via some other type of (wired) communication port. Communication device 252 may be powered by the television receiver 150 or may be separately coupled with a power source. In some embodiments, television receiver 150 may be enabled to communicate with a local wireless network and may use communication device 252 in order to communicate with devices that use a ZigBee® communication protocol, Z-Wave® communication protocol, and/or some other home wireless communication protocols.

Still referring to FIG. 2, communication device 252 may also serve to allow additional components to be connected with television receive 150. For instance, communication device 252 may include additional audio/video inputs (e.g., HDMI), component, and/or composite input to allow for additional devices (e.g., Blu-ray players) to be connected with television receiver 150. Such connection may allow video from such additional devices to be overlaid with home automation information. Merely by way of example, whether home automation information is overlaid onto video may be triggered based on a user's press of a remote control button.

As shown in FIG. 2, regardless of whether television receiver 150 uses communication device 252 to communicate with home automation devices, television receiver 150 may be configured to output home automation information for presentation to a user via display device 160. Such information may be presented simultaneously with television programming received by television receiver 150, such as via system 100 of FIG. 1 described above. Television receiver 150 may also, at a given time, output only television programming or only home automation information based on a user's preference. The user may be able to provide input to television receiver 150 to control the home automation system hosted by television receiver 150 or by overlay device 251, as detailed below.

Still referring to FIG. 2, in some embodiments, television receiver 150 may not be used as a host for a home automation system. Rather, a separate device may be coupled with television receiver 150 that allows for home automation information to be presented to a user via display device 160. This separate device may be coupled with television receiver 150. In some embodiments, the separate device is referred to as overlay device 251. Overlay device 251 may be configured to overlay information, such as home automation information, onto a signal to be visually presented via display device 160, such as a television. In some embodiments, overlay device 251 may be coupled between television receiver 150, which may be in the form of a set top box, and display device 160, which may be a television. In such embodiments, television receiver 150 may receive, decode, descramble, decrypt, store, and/or output television programming and/or home automation functions. Television receiver 150 may output a signal, such as in the form of an HDMI signal. Rather than be directly input to display device 160, the output of television receiver 150 may be input to overlay device 251. Overlay device 251 may receive the video and/or audio output from television receiver 150. Overlay device 251 may add additional information to the video, audio and/or home automation function signal received from television receiver 150. The modified video and/or audio signal may be output to display device 160 for presentation. In some embodiments, overlay device 251 has an HDMI input and an HDMI output, with the HDMI output being connected to display device 160. To be clear, while FIG. 2 illustrates lines illustrating communication between television receiver 150 and various devices, it should be understood that such communication may exist, in addition or in alternate via communication device 252 and/or with overlay device 251.

Referring again to FIG. 2, in some embodiments, television receiver 150 may be used to provide home automation functionality while overlay device 251 may be used to present information via display device 160. It should be understood that the home automation functionality detailed herein in relation to a television receiver may alternatively be provided via overlay device 251. In some embodiments, overlay device 251 may provide home automation functionality and be used to present information via display device 160. Using overlay device 251 to present automation information via display device 160 may have additional benefits. For instance, multiple devices may provide input video to overlay device 251. For instance, television receiver 150 may provide television programming to overlay device 251, a DVD/Blu-Ray player may provide video overlay device 251, and a separate internet-TV device may stream other programming to overlay device 251. Regardless of the source of the video/audio, overlay device 251 may output video and/or audio that has been modified to include home automation information, such as a pop-up overlay with a prompt message, and output to display device 160. As such, in such embodiments, regardless of the source of video/audio, overlay device 251 may modify the audio/video to include home automation information and, possibly, solicit for user input. For instance, in some embodiments overlay device 251 may have four video inputs (e.g., four HDMI inputs) and a single video output (e.g., an HDMI output). In other embodiments, such overlay functionality may be part of television receiver 150. As such, a separate device, such as a Blu-ray player may be connected with a video input of television receiver 150, thus allowing television receiver 150 to overlay home automation information when content from the Blu-Ray player is being output to display device 160.

Still referring to FIG. 2, regardless of whether television receiver 150 is itself configured to provide home automation functionality and output home automation input for display via display device 160 or such home automation functionality is provided via overlay device 251, home automation information may be presented by display device 160 while television programming is also being presented by display device 160. For instance, home automation information may be overlaid or may replace a portion of television programming (e.g., broadcast content, stored content, on-demand content, etc.) presented via display device 160. Merely by way of example, while television programming is being presented (e.g., a television show on scuba diving), the display is augmented with information related to home automation. This television show may represent broadcast programming, recorded content, on-demand content, or some other form of content. In one example, the presented home automation information is related to motion being detected by a camera at a front door of a location. Such augmentation of the television programming may be performed directly by television receiver 150 (which may or may not be in communication with communication device 252) or overlay device 251 connected with television receiver 150 and display device 160. Such augmentation may result in solid or partially transparent graphics being overlaid onto television programming (or other forms of video) output by television receiver 150. Overlay device 251 or television receive 150 may be configured to add or modify sound to television programming. For instance, in response to a doorbell ring, a sound may be played through the display device (or connected audio system). In addition or in alternate, a graphic may be displayed. In other embodiments, camera data (e.g., nanny camera data) and/or associated sound or motion sensors may be integrated in the system and overlaid or otherwise made available to a user. For example, detection of a crying baby from a nanny camera may trigger an on-screen alert to a user watching television.

Still in reference to FIG. 2, such presented home automation information may request user input. For instance, a user, via controls of television receiver 150 (e.g., a remote control) or controls of overlay device 251, can specify whether video from a camera at the front door should be presented, not presented, or if future notifications related to such motion such be ignored. If ignored, this may be for a predefined period of time, such as an hour, or until the television receiver 150 or overlay device 251 is powered down and powered back on. Ignoring of video may be particularly useful if motion or some other event is triggering the presentation of video that is not interesting to a viewer of display device 160 (or a wireless device), such as children playing on the lawn or snow falling.

As shown in FIG. 2, television receiver 150 or overlay device 251 may be configured to communicate with one or more wireless devices, such as wireless device 216. Wireless device 216 may represent a tablet computer, cellular phone, laptop computer, remote computer, or some other device through which a user may desire to control home automation settings and view home automation information. Such a device also need not be wireless, such as a desktop computer. Television receiver 150, communication device 252, or overlay device 251 may communicate directly with wireless device 216, or may use a local wireless network, such as network 270. Wireless device 216 may be remotely located and not connected with a same local wireless network. Via the internet, television receiver 150 or overlay device 251 may be configured to transmit a notification to wireless device 216 regarding home automation information. For instance, in some embodiments, a third-party notification server system, such as the notification server system operated by Apple®, may be used to send such notifications to wireless device 216.

Further shown in FIG. 2, in some embodiments, a location of wireless device 216 may be monitored. For instance, if wireless device 216 is a cellular phone, when its position indicates it has neared a door, the door may be unlocked. A user may be able to define which home automation functions are controlled based on a position of wireless device 216. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 150.

Still referring to FIG. 2, in some embodiments, little to no setup of network 270 may be necessary to permit television receiver 150 to stream data out to the Internet. For instance, television receiver 150 and network 270 may be configured, via a service such as Sling® or other video streaming service, to allow for video to be streamed from television receiver 150 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall Still referring to FIG. 2, as an example of how wireless device 216 may be used in conjunction with television receiver 150 or overlay device 251 for controlling a home automation system, a wireless device 216 may be in communication with television receiver 150 serving as the host of a home automation system. At approximately a same time that the home automation information is presented via display device 160 (assuming it is turned on), similar information may be sent to wireless device 216, such as via a third-party notification server or directly from television receiver 150 or overlay device 251 via a local wireless network. A user of wireless device 216 can specify whether video from a camera at the front door should be presented by wireless device 216, not presented, or if future notifications related to such motion such be ignored. If ignored, this may be for a predefined period of time, such as an hour or some other predefined or user-selected period of time. In this way, a user interface of the wireless device 216 may correspond to an overlay of the home automation information and/or prompt appearing on the display device 160.

Referring again to FIG. 2, wireless device 216 may serve as an input device for television receiver 150. For instance, wireless device 216 may be a tablet computer that allows text to be typed by a user and provided to television receiver 150. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While wireless device 216 may be used as the input device for typing text, television receiver 150 may output for display text to display device 160.

Still referring to FIG. 2, wireless device 216 may be configured to store a software model of home automation system intended to mirror the software model stored by television receiver 150, which is hosting the home automation system. For instance, such a software model may allow wireless device 216 to view, communicate with, and/or interact with various home automation devices. Such a software model may indicate the state of various home automation devices. When wireless device 216 is not in communication with television receiver 150, changes to the home automation model made at television receiver 150 may not be known to wireless device 216. A history list maintained by television receiver 150 and/or a synchronization point numerical value, whereby each change to the home automation model by television receiver 150 is assigned a value and synchronized at a later point with the wireless device 216, may be implemented. In another aspect, the wireless device 216 may be utilized by a user for entering and/or confirming rules and other settings of the home automation system, and such settings may be synchronized or otherwise communicated with the television receiver 150.

Further shown in FIG. 2, in some embodiments, a cellular modem 253 may be connected with either overlay device 251 or television receiver 150. Cellular modem 253 may be useful if a local wireless network is not available. For instance, cellular modem 253 may permit access to the internet and/or communication with a television service provider. Communication with a television service provider, such as television service provider system 110 of FIG. 1, may also occur via a local wireless or wired network connected with the Internet. In some embodiments, information for home automation purposes may be transmitted by television service provider system 110 to television receiver 150 or overlay device 251 via the television service provider's distribution network, which may include the use of satellites 130.

As shown in FIG. 2, various home automation devices may be in communication with television receiver 150 or overlay device 251. Such home automation devices may use disparate communication protocols. Such home automation devices may communicate with television receiver 150 directly or via communication device 252. Such home automation devices may be controlled by a user and/or have a status viewed by a user via display device 160 and/or wireless device 216. Such home automation device may include one or more of the following, as discussed below.

As shown in FIG. 2, one or more cameras, such as camera 212. Camera 212 may be either indoors or outdoors and may provide a video and, possibly, audio stream which can be presented via wireless device 216 and/or display device 160. Video and/or audio from camera 212 may be recorded by overlay device 251 or television receiver 150 upon an event occurring, such as motion being detected by camera 212. Video and/or audio from camera 212 may be continuously recorded such as in the form of a rolling window, thus allowing a period of time of video/audio to be reviewed by a user from before a triggering event and after the triggering event. Video may be recorded on a storage local to overlay device 251 or television receiver 150, or may be recorded and or storage on external storage devices, such as a network attached storage device. In some embodiments, video may be transmitted across the local and/or wide area network to other storage devices upon occurrence of a trigger event for later playback. For initial setup, a still from camera 212 may be captured by and stored by television receiver 150 for subsequent presentation as part of a user interface via display device 160 such that the user can determine which camera (if multiple cameras are present) is being set up and/or later accessed. For example a user interface may display a still image from a front door camera (which is easily recognized by the user because it shows a scene in front of the house's front door) to allow a user to select the front door camera for viewing.

For instance, as shown in FIG. 2, video and, possibly, audio from camera 212 may be available live for viewing by a user via overlay device 251 or television receiver 150. Such video may be presented simultaneously with television programming being presented. In some embodiments, video may only be presented if motion is detected by camera 212, otherwise video from camera 212 may not be presented by the display device presenting television programming. Also, such video (and, possibly, audio) from camera 212 may be recorded by television receiver 150 or overlay device 251. Such video may be recorded based upon a timer configured by a user. For instance, camera 212 may be incorporated into an electronic programming guide (EPG) output for display by television receiver 150. For instance, camera 212 may be presented as a "channel" as part of the EPG along with other television programming channels. A user may be permitted to select the channel associated with camera 212 for presentation via display device 160 (or wireless device 216). The user may also be permitted to set a timer to record the channel of camera 212 for a user-defined period of time on a user-defined date. Such recording may not be constrained by the rolling window associated with a triggering event being detected. For instance, recording camera 212 based on a timer may be useful if a babysitter is going to be watching a child and the parents want to later review the babysitter's behavior in their absence. In some embodiments, video from camera 212 may be backed up to a remote storage device, such as cloud-based storage hosted by home automation service server 112. Other data may also be cached to the cloud, such as configuration settings. Thus, if the television receiver 150 or overlay device 251 malfunctions, then a new device may be installed and the configuration data loaded onto the device from the cloud.

Further shown in FIG. 2, window sensor 210 and door sensor 208 may transmit data to television receiver 150 (possibly via communication device 252) or overlay device 251 that indicates the status of a window or door, respectively. Such status may indicate open or closed. When a status change occurs, the user may be notified as such via wireless device 216 or display device 160. Further, a user may be able to view a status screen to view the status one or more window sensors and/or one or more door sensors throughout the location. Window sensor 210 and/or door sensor 208 may have integrated glass break sensors to determine if glass has been broken.

Still shown in FIG. 2, one or more smoke and/or $CO_2$ detectors 209 may be integrated as part of a home automation system. As such, alerts as to whether a fire or $CO_2$ has been detected can be sent to television receiver 150, wireless device 216, and/or emergency first responders. Further, television receiver 150 and/or wireless device 216 may be used to disable false alarms. One or more sensors may be integrated or separate to detect gas leaks, radon, or various other dangerous situations.

Still referring to FIG. 2, pet door and/or feeder 211 may allow for pet related functionality to be integrated with television receiver 150. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door via wireless device 150 and/or wireless device 216.

Still shown in FIG. 2, weather sensor 206 may allow television receiver 150 or overlay device 251 to receive, identify, and/or output various forms of environmental data, including temperature, humidity, wind speed, barometric pressure, etc. Television receiver 150 or overlay device 251 may allow for control of one or more shades, such as window, door, and/or skylight shades, within a house. Shade controller 204 may respond to commands from television receiver 150 or overlay device 251 and may provide status updates (e.g., shade up, shade 50% up, shade down, etc.).

As shown in FIG. 2, in some embodiments, television receiver 150 may receive and notify a user of the status of electrical appliances such as refrigerators and dishwashers within the house. The television receiver 150 may be linked to the appliances and presents a notification message to the user through whatever device the user is using at the time, such as a tablet computer, mobile phone or thin client. U.S. patent application Ser. No. 12/700,310, filed Feb. 4, 2010, entitled "Electronic Appliance Status Notification via a Home Entertainment System", which is hereby incorporated by reference, describes such techniques in further detail.

Also shown in FIG. 2, utility monitor 202 may serve to provide television receiver 150 or overlay device 251 with utility information, such as electricity usage, gas usage, water usage, wastewater usage, irrigation usage, etc. A user may view a status page or may receive notifications upon predefined events occurring, such as electricity usage exceeding a defined threshold within a month, or current kilowatt usage exceeding a threshold.

FIG. 2 further shows a health sensor 214 that may permit a user's vital characteristics to be monitored, such as a heart rate. In some embodiments, additionally or alternatively, health sensor 214 may contain a button or other type of actuator that a user can press to request assistance. As such, health sensor 214 may be mounted to a fixed location, such as bedside, or may be carried by a user, such as on a lanyard. Such a request may trigger a notification to be presented to other users via display device 160 and/or wireless device 216. Additionally or if the notification is not cleared by another user within a predefined period of time, a notification may be transmitted to emergency first responders to request help. In some embodiments, a home automation service provider may first try contacting the user, such as via phone, to determine if an emergency is indeed occurring. Such a health sensor 214 may have additional purposes, such as for notification of another form of emergency, such as a break-in, fire, flood, theft, disaster, etc. In some examples, the health sensor 214 may receive signals from various cameras, temperature sensors, and other monitoring equipment in connection with the home automation system, analyze such signals, and store or report such signals as necessary.

Still referring to FIG. 2, in some embodiments, health sensor 214 may be used as a medical alert pendant that can be worn or otherwise carried by a user. It may contain a microphone and/or speaker to allow communication with other users and/or emergency first responders. Television receiver 150 or overlay device 251 may be preprogrammed to contact a particular phone number (e.g., emergency service provider, relative, caregiver, etc.) based on an actuator of health sensor 214 being activated by a user. The user may be placed in contact with a person via the phone number and the microphone and/or speaker of health sensor 214. Camera data may be combined with such alerts in order to give a contacted relative more information regarding the medical situation. For example, health sensor 214, when activated in the family room, may generate a command which is linked with security camera footage from the same room. In some embodiments, health sensor 214 may be able to monitor vitals of a user, such as a blood pressure, temperature, heart rate, blood sugar, etc. In some embodiments, an event, such as a fall or exiting a structure can be detected. Further, parallel notifications may be sent by the health sensor 214 to multiple user devices at approximately the same time. As such, multiple people can be made aware of the event at approximately the same time (as opposed to serial notification). Which users are notified for which type of event may be customized by a user of television receiver 150.

Further in reference to FIG. 2, in addition to such parallel notifications being based on data from health sensor 214, data from other devices may trigger such parallel notifications according to various rules within the home automation system. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications. A configuring user may be able to select from a list of users provided by the home automation system to notify and method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be 1) SMS Message, 2) push notification, 3) electronic voice recorder places call to primary number, and 4) electronic voice recorder places call to spouse's number. The second notification may never happen if the user replies to the SMS message with an acknowledgment. Or, the second notification would automatically happen if the SMS gateway cannot be contacted.

Referring again to FIG. 2, intercom 218 may permit a user in one location to communicate with a user in another location, who may be using wireless device 216, display device 160 or some other device, such another television receiver within the structure. Intercom 218 may be integrated with camera 212 or may use a dedicated microphone/speaker, such as a Bluetooth® microphone. Microphones/speakers of wireless device 216, display device 160, communication device 252, overlay device 251 may also or alternatively be used. A multimedia over coax (MOCA) network or other appropriate type of network may be used to provide audio and/or video based intercom via television receiver 150 with other television receivers and/or wireless devices in communication with television receiver 150. Similarly, video and/or audio conferencing can be provided, such that communication with persons via the Internet is possible. Therefore, one possible use would be video and/or audio conferencing within a structure using each television receiver (and associated connected display devices) in the structure that are in communication, or allowing each television receiver to perform video/audio conferencing with other devices external to the structure or local area network.

Referring to FIG. 2, to enable intercom 218, a microphone may be placed in a location where a user would typically be using intercom 218. For instance, a microphone may be placed near display device 160. In some embodiments, a microphone may be integrated into a remote control of television receiver 150. As such, if a user is using television receiver 150 via remote control, the user would have access to a microphone. In at least one embodiment, a user can leverage the wireless device 216, such as a mobile phone or tablet computer, as the microphone for the home automation system.

Referring again to FIG. 2, doorbell sensor 223 may permit an indication of when a doorbell has been rung to be sent to multiple devices, such as television receiver 150 and/or wireless device 216. In some embodiments, doorbell sensor 223 detecting a doorbell ring may trigger video to be recorded by camera 212 of the area near the doorbell and the video to be stored until deleted by a user (or stored for predefined period of time).

Further, as shown in FIG. 2, such a microphone, or a microphone on one or more other home automation devices, may allow for voice recognition to be performed by television receiver 150. Voice recognition may allow for a particular user to be determined and for commands to be completed based on a user speaking such commands. For instance, an adult user may be permitted to perform certain functions that a child user cannot; such as unlocking doors. Each user may provide a voice sample which is used by television receiver 150 to distinguish users from each other. Further, users may be able to speak commands, such as "lower heat 5 degrees," to control home automation devices. Based on the command received, television receiver 150 may determine to which home automation device the command is intended and may transmit an appropriate command (such as, in this example, a command to lower the heat setting by five degrees to thermostat 222). In at least one embodiment, a user may use a user-defined code word that precedes or follows a command, such as "sesame," then speaking a command such as "turn on the living room lights." In some embodiments, in addition or in alternate to voice identification, fingerprint identification may be used to determine an identify of a user. Specific functions of television receiver 150 may require that a user log in, such as via a fingerprint scanner, before being able to view and/or modify such functions.

Referring to FIG. 2, light controller 220 may permit a light to be turned on, off, and/or dimmed by television receiver 150 or overlay device 251 (such as based on a user command received via wireless device 216 or directly via television receiver 150 or overlay device 251). Light controller 220 may control a single light. As such, multiple different light controllers 220 may be present within a house. In some embodiments, a physical light switch (which opens and closes a circuit of the light) may be left in the on position such that light controller 220 can be used to control whether the light is on or off. Light control 220 may be integrated into a light bulb or into a circuit (such as between the light fixture and the power source) to control whether the light is on or off. The user, via television receiver 150 or overlay device 251 may be permitted to view a status of all light controllers 220 within a location. Since television receiver 150 or overlay device 251 may communicate using different home automation protocols, different light controllers 220 (and, more generally, different home automation devices) within a location may use disparate communication protocols, but may all still be controlled by television receiver 150 or overlay device 251. In some embodiments, wireless light switches may be used that communicate with television receiver 150 or overlay device 251. Such switches may use a different communication protocol than light controllers 220. Such a difference may not affect functionality because television receiver 150 or overlay device 251 can serve as a hub for multiple disparate communication protocols and perform any necessary translation and/or bridging functions. For example, a tablet computer may transmit a command over a WiFi connection and television receiver 150 or overlay device 251 may translate the command into an appropriate Zigbee or Zwave command for a wireless light bulb. In some embodiments, the translation may occur for a group of disparate devices. For example, a user decides to turn off all lights in a room and selects a lighting command on the tablet computer. The overlay device 251 identifies the lights in the room and outputs appropriate commands to all devices over different protocol, such as a Zigbee wireless lightbulb and a Zwave table lamp. Television receiver 150 may permit timers and/or dimmer settings to be set for lights via light controller 220. For instance, lights can be configured to turn on/off at various times during a day according to a schedule (and/or events being detected by the home automation system).

Referring again to FIG. 2, thermostat 222 may communicate with television receiver 150 or overlay device 251. Thermostat 222 may provide heating/cooling updates on the location to television receiver 150 or overlay device 251 for display via display device 160 and/or wireless device 216. Further, control of thermostat 222 may be effectuated via television receiver 150 or overlay device 251. Zone control within a structure using multiple thermostats may also be possible.

Leak detection sensor 224 of FIG. 2 may be in communication with television receiver 150 or overlay device 251 and may be used to determine when a water leak as occurred, such as in pipes supplying water-based fixtures with water. Leak detection sensor 224 may be configured to attach to the exterior of a pipe and listen for a sound of water moving within a pipe. In other embodiments, sonar, temperature sensors or ion infused water with appropriate sensors may be used to detect moving water. As such, cutting or otherwise modifying plumbing may not be necessary to use leak detection sensor 224. If water movement is detected for greater than a threshold period of time, it may be determined a leak is occurring. Leak detection sensor 224 may have a component that couples over an existing valve such that the flow of water within one or more pipes can be stopped. For instance, if leak detection sensor 224 determines a leak may be occurring, a notification may be provided to a user via wireless device 216 and/or display device 160 by television receiver 150 or overlay device 251. If a user does not clear the notification, the flow of water may be shut off by leak detection sensor 224 after a predefined period of time. A user may also be able to provide input to allow the flow of water to continue or to immediately interrupt the flow of water.

In FIG. 2, the home automation system may utilize various rules to determine whether a leak is occurring. For example, a measurement threshold may be utilized in the event that water is flowing to an ice machine. The amount of water typically drawn by such a device may be known, if the flow rate and/or flow time significantly exceeds normal operating parameters, it may be determined that a leak is occurring. In some embodiments, the home automation system may communicate with appliances to determine whether water is flowing to the device. For example, a home automation system may communicate with a washing machine in operation to determine that water is flowing to the appliance, and thus, determine that a water leak is not occurring. If no appliance is using water (and, possibly, it is known that no user is home) it may be determined that a leak is occurring. In other embodiments, data from various motion sensors may be utilized. For example, if the system identifies that users have left the home, but a large flow of water is occurring, then the system may determine that a leak is occurring and notify a user or take remedial steps accordingly.

Further shown in FIG. 2, VoIP (voice over IP) controller 225 may permit television receiver 150 to serve as a hub for a home phone system. One or more conventional telephones may be connected with television receiver 150. Calls may be converted to IP by television receiver 150 and allow for calls to be received and placed via network 270, which is connected with the Internet. The need for a dedicated home phone line may thus be eliminated. In some embodiments, a cellular back channel (e.g., via a cellular modem) may be utilized as a backup to other types of internet connections, such as DSL, cable modems or satellite internet.

Appliance controller 226 of FIG. 2 may permit a status of an appliance to be retrieved and commands to control operation to be sent to an appliance by television receiver 150 or overlay device 251. For instance, appliance controller 226 may control a washing machine, a dryer, a dishwasher, an oven, a microwave, a refrigerator, a toaster, a coffee maker, a hot tub, or any other form of appliance. Appliance controller 226 may be connected with the appliance or may be integrated as part of the appliance.

Appliances and other electronic devices may also be monitored for electricity usage. For instance, US Pat. Pub. No. 2013/0318559, filed Nov. 19, 2012, to Crabtree, entitled "Apparatus for Displaying Electrical Device Usage Information on a Television Receiver," which is hereby incorporated by reference, may allow for information regarding the electricity usage of one or more devices (e.g., other home automation devices or circuits within a home that are monitored) to be determined. Control of one or more home automation devices may be dependent on electrical usage and stored electrical rates. For instance, a washing machine may be activated in the evening when rates are lower. Additionally or alternatively, operation of devices may be staggered to help prevent consuming too much power at a given time. For instance, an electric heater may not be activated until a dryer powered via the same circuit is powered down.

Garage door controller 228 of FIG. 2 may permit a status of a garage door to be checked and the door to be opened or closed by a user via television receiver 150 or overlay device 251. In some embodiments, based on a location of wireless device 216, the garage door may be controlled. For instance, if wireless device 216 is a cellular phone and it is detected to have moved a threshold distance away from a house having garage door controller 228 installed, a notification may be sent to wireless device 216. If no response is received within a threshold period of time, the garage may be automatically shut. If wireless device 216 moves within a threshold distance of garage door controller 228, the garage may be opened.

Lock controller 230 of FIG. 2 may permit a door to be locked and unlocked and/or monitored by a user via television receiver 150 or overlay device 251. In some embodiments, lock controller 230 may have an integrated door sensor 208 to determine if the door is open, shut, or partially ajar. Being able to only determine if a door is locked or unlocked may not be overly useful—for instance, a lock may be in a locked position, but if the door is ajar, the lock may not prevent access to the house. Therefore, for security, a user may benefit from knowing both that a door is closed (or open) and locked (or unlocked). To accomplish such notification and control, lock controller 230 may have an integrated door sensor 208 that allows for the single lock controller 230 to lock/unlock a door and provide a status as to whether the door is open or shut. Therefore, a single device may control a lock and determine whether the associated door is shut or open. No mechanical or electrical component may need to be integrated separately into a door or doorframe to provide such functionality. Such a single device may have a single power source that allows for sensing of the lock position, sensing of the door position, and for engagement/disengagement of the lock. Lock controller 230 may have an integrated door sensor that includes a reed switch or proximity sensor that detects when the door is in a closed position, with a plate of the lock in proximity to a plate on the door frame of the door. For instance, a plate of the lock may have an integrated magnet or magnetized doorframe plate. When in proximity to the magnet, a reed switch located in lock controller 230 may be used to determine that the door is closed; when not in proximity to the magnet, the reed switch located in lock controller 230 may be used to determine that the door is at least partially ajar. Rather than using a reed switch, other forms of sensing may also be used, such as a proximity sensor to detect a doorframe. In some embodiments, the sensor to determine the door is shut may be integrated directly into the deadbolt or other latching mechanism of lock controller 230. When the deadbolt is extended, a sensor may be able to determine if the distal end of the deadbolt is properly latched within a door frame based on a proximity sensor or other sensing means.

A home security system 207 of FIG. 2 may be integrated with a home automation system. The home security system 207 may detect motion, when a user has armed/disarmed the home security system 207, when windows/doors are opened or broken, etc. Television receiver 150 may adjust settings based of home automation devices based on home security system 207 being armed or disarmed. A virtual control and alarm panel may be presented to a user via a display device 160 and television receiver 150. The functions of a wall mounted panel alarm can be integrated in the graphical user interface of the TV viewing experience such as a menu system with an underlying tree structure. The virtual control and alarm panel can appear in a full screen or Picture-in-Picture (PiP) with TV content. Alarms and event notification can be in the form of scrolling text overlays, popups, flashing icons, etc. Camera video (e.g., from camera 212) can be integrated with the standard DVR content of television receiver 150 with additional search, zoom, time-line capabilities. The camera's video stream can be displayed full screen, PiP with TV content, or as a tiled mosaic to display multiple camera's streams at a same time. In some embodiments, the display can switch between camera streams at fixed intervals. Television receiver 150 may perform video scaling, adjust frame rate and transcoding on video received from camera 212. In addition, television receiver 150 may adaptively transcode the camera content to match an Internet connection.

Irrigation controller 232 of FIG. 2 may allow for a status and control of an irrigation system (e.g., sprinkler system) to be controlled by a user via television receiver 150 and/or overlay device 251. Irrigation controller 232 may be used in conjunction with weather sensor 206 to determine whether and/or for how long irrigation controller 232 should be activated for watering. Further, a user, via television receiver 150 and/or overlay device, may turn on, turn off, or adjust settings of irrigation controller 232.

One or more motion sensors can be incorporated into one or more of the previously detailed home automation devices or as a stand-alone device. Such motion sensors may be used to determine if a structure is occupied. Such information may be used in conjunction with a determined location of one or more wireless devices. If some or all users are not present in the structure, home automation settings may be adjusted, such as by lowering a temperature of thermostat 222, shutting off lights via light controller 220, and determining if one or more doors are closed by door sensor 208. In some embodiments, a user-defined script may be run when it is determined that no users or other persons are present within the structure.

Additional forms of sensors not illustrated in FIG. 2 may also be incorporated as part of a home automation system. For instance, a mailbox sensor may be attached to a mailbox to determine when mail is present and/or has been picked up. The ability to control one or more showers, baths, and/or faucets from television receiver 150 and/or wireless device 216 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 150 when within range. For instance, when a vehicle has been parked within range of a local wireless network with which television receiver 150 is connected, video and/or audio may be transmitted from the dashcam to the television receiver for storage and/or uploading to a remote server.

The home automation functions detailed herein that are attributed to television receiver 150 may alternatively or additionally be incorporated into overlay device 251. As such, a separate overlay device 251 may be connected with display device 160 to provide home automation functionality.

Figure 3:
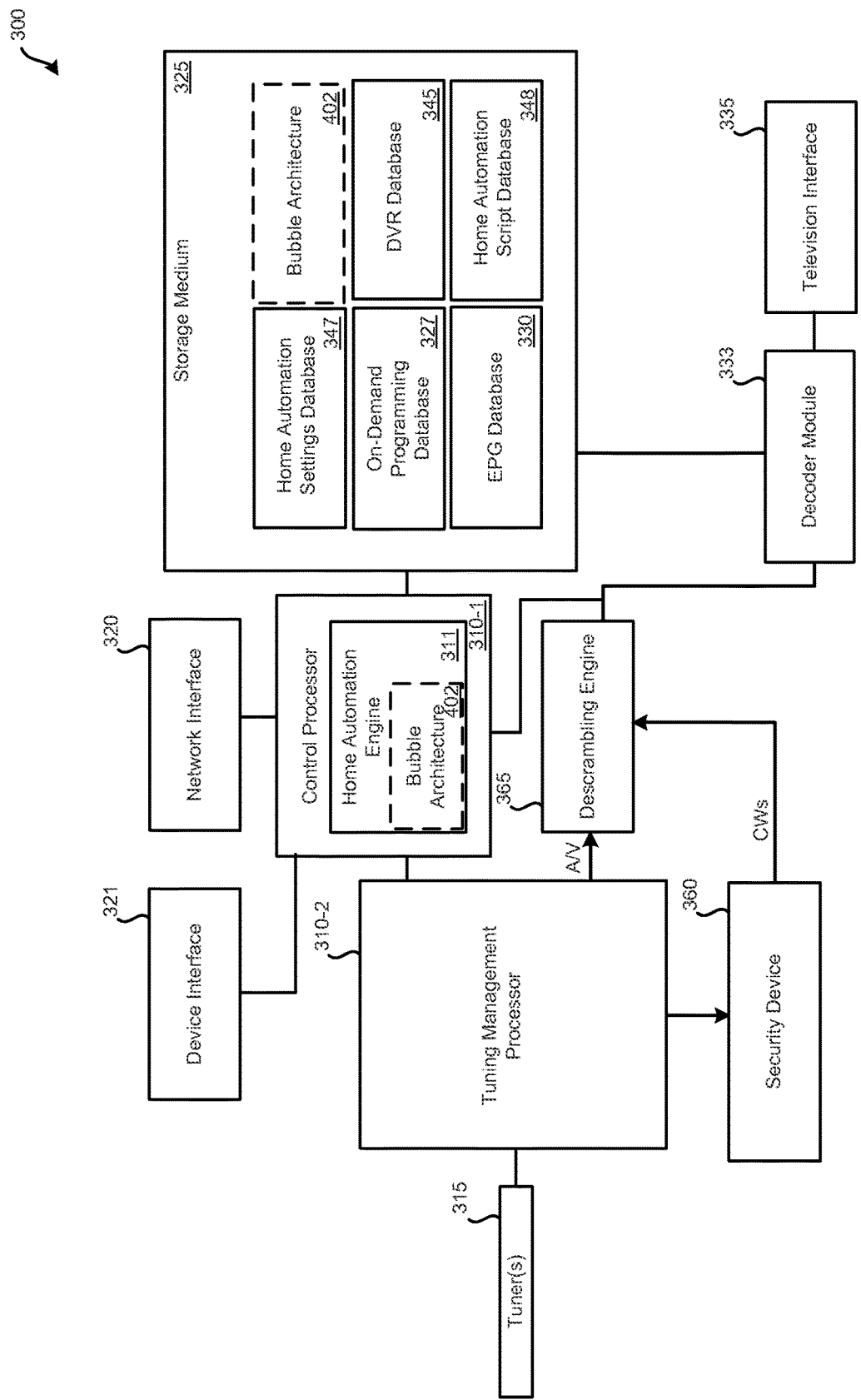
FIG. 3 shows an embodiment of a television receiver configured to host a home automation system.

Turning now to FIG. 3, an embodiment of a television receiver 300, which may represent television receiver 150 of FIG. 1 and/or FIG. 2, is illustrated. Television receiver 300 may be configured to function as a host for a home automation system either alone or in conjunction with a communication device, such as communication device 252 of FIG. 2. Television receiver 300 may be in the form of a separate device configured to be connected with a display device, such as a television. Embodiments of television receiver 300 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

As shown in FIG. 3, television receiver 300 may be incorporated as part of a television, such as display device 160 of FIG. 1. Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, digital video recorder (DVR) database 345 (which may include provider-managed television programming storage and/or user-defined television programming), on-demand programming database 327, home automation settings database 347, home automation script database 348, remote control interface 350, security device 360, and/or descrambling engine 365. In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components.

In FIG. 3, processors 310 may include one or more specialized and/or general-purpose processors configured to perform processes such as tuning to a particular channel, accessing and displaying EPG information from EPG database 330, and/or receiving and processing input from a user. It should be understood that the functions performed by various modules of FIG. 3 may be performed using one or more processors. As such, for example, functions of descrambling engine 365 may be performed by control processor 310-1.

Control processor 310-1 of FIG. 3 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320 and remote control interface 350. Control processor 310-1 may handle incoming data from network interface 320 and remote control interface 350. Additionally, control processor 310-1 may be configured to output data via network interface 320.

Control processor 310-1 of FIG. 3 may include the home automation engine 311. Home automation engine 311 may permit television receiver 300 and control processor 310-1 to provide home automation functionality. Home automation engine 311 may have a JSON (JavaScript Object Notation) command interpreter or some other form of command interpreter that is configured to communicate with wireless devices via network interface 320 and a message server (possibly via a message server client). Such a command interpreter of home automation engine 311 may also communicate via a local area network with devices (without using the Internet). Home automation engine 311 may contain multiple controllers specific to different protocols; for instance, a ZigBee® controller, a Z-Wave® controller, and/or an IP camera controller (wireless LAN, 802.11) may be present. Home automation engine 311 may contain a media server configured to serve streaming audio and/or video to a remote devices (on a local area network or the Internet). Television receiver may be able to serve such devices with recorded content, live content, and/or content recorded using one or more home automation devices, such as camera 212.

Tuners 315 of FIG. 3 may include one or more tuners used to tune to transponders that include broadcasts of one or more television channels. Such tuners may be used also to receive for storage on-demand content and/or credit-earning television commercials and/or home automation functions. In some embodiments, two, three, or more than three tuners may be present, such as four, six, or eight tuners. Each tuner contained in tuners 315 may be capable of receiving and processing a single transponder stream from a satellite transponder (or from a cable network) at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 to which frequencies are to be tuned.

Network interface 320 of FIG. 3 may be used to communicate via an alternate communication channel with a television service provider, if such communication channel is available. A communication channel may be via satellite (which may be unidirectional to television receiver 300) and the alternate communication channel (which may be bidirectional) may be via a network, such as the Internet. Data may be transmitted from television receiver 300 to a television service provider system and from the television service provider system to television receiver 300. Information may be transmitted and/or received via network interface 320. For instance, instructions from a television service provider may also be received via network interface 320, if connected with the Internet. Besides the primary communication channel being satellite, cable network, an IP-based network, or broadcast network may be used. Network interface 320 may permit wireless communication with one or more types of networks, including using home automation network protocols and wireless network protocols. Also, wired networks may be connected to and communicated with via network interface 320. Device interface 321 may represent a USB port or some other form of communication port that permits communication with a communication device.

Storage medium 325 of FIG. 3 may represent one or more non-transitory computer-readable storage mediums. Storage medium 325 may include memory and/or a hard drive. Storage medium 325 may be used to store information received from one or more satellites and/or information received via network interface 320. Storage medium 325 may store information related to on-demand programming database 327, EPG database 330, DVR database 345, home automation settings database 347, and/or home automation script database 348. Recorded television programs may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

Home automation settings database 347 of FIG. 3 may allow configuration settings of home automation devices and user preferences to be stored. Home automation settings database 347 may store data related to various devices that have been set up to communicate with television receiver 300. For instance, home automation settings database 347 may be configured to store information on which types of events should be indicated to users, to which users, in what order, and what communication methods should be used. For instance, an event such as an open garage may only be notified to certain wireless devices (e.g., a cellular phone associated with a parent, not a child), notification may be by a third-party notification server, email, text message, and/or phone call. In some embodiments, a second notification method may only be used if a first fails. For instance, if a notification cannot be sent to the user via a third-party notification server, an email may be sent.

Home automation settings database 347 of FIG. 3 may store information that allows for the configuration and control of individual home automation devices which may operate using Z-wave and Zigbee—specific protocols. To do so, home automation engine 311 may create a proxy for each device that allows for settings for the device to be passed through a UI (e.g., presented on a television) to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device.

Home automation script database 348 of FIG. 3 may store scripts that detail how home automation devices are to function based on various events occurring. For instance, if stored content starts being played back by television receiver 300, lights in the vicinity of display device 160 may be dimmed and shades may be lowered by shade controller 204. As another example, when a user shuts programming off late in the evening, there may be an assumption the user is going to bed. Therefore, the user may configure television receiver 300 to lock all doors via lock controller 230, shut the garage door via garage controller 228, lower a heat setting of thermostat 222, shut off all lights via light controller 220, and determine if any windows or doors are open via window sensor 210 and door sensor 208 (and, if so, alert the user). Such scripts or programs may be predefined by the home automation/television service provider and/or may be defined by a user.

In some embodiments, home automation script database 248 of FIG. 3 may allow for various music profiles to be implemented. For instance, based on home automation settings within a structure, appropriate music may be played. For instance, if the lights are dimmed, romantic music may be played. Conversely, based on the music being played, settings of home automation devices may be determined. If television programming, such as a movie, is output for playback by television receiver 150, a particular home automation script may be used to adjust home automation settings (e.g., lower lights, raise temperature, and lock doors).

EPG database 330 of FIG. 3 may store information related to television channels and the timing of programs appearing on such television channels. EPG database 330 may be stored using storage medium 325, which may be a hard drive or solid-state drive. Information from EPG database 330 may be used to inform users of what television channels or programs are popular and/or provide recommendations to the user. Information from EPG database 330 may provide the user with a visual interface displayed by a television that allows a user to browse and select television channels and/or television programs for viewing and/or recording. Information used to populate EPG database 330 may be received via network interface 320, via satellite, or some other communication link with a television service provider (e.g., a cable network). Updates to EPG database 330 may be received periodically. EPG database 330 may serve as an interface for a user to control DVR functions of television receiver 300, and/or to enable viewing and/or recording of multiple television channels simultaneously. EPG database 340 may also contain information about on-demand content or any other form of accessible content.

Decoder module 333 of FIG. 3 may serve to convert encoded video and audio into a format suitable for output to a display device. For instance, decoder module 333 may receive MPEG video and audio from storage medium 325 or descrambling engine 365 to be output to a television. MPEG video and audio from storage medium 325 may have been recorded to DVR database 345 as part of a previously-recorded television program. Decoder module 333 may convert the MPEG video and audio into a format appropriate to be displayed by a television or other form of display device and audio into a format appropriate to be output from speakers, respectively. Decoder module 333 may have the ability to convert a finite number of television channel streams received from storage medium 325 or descrambling engine 365, simultaneously. For instance, decoders within decoder module 333 may be able to only decode a single television channel at a time. Decoder module 333 may have various numbers of decoders.

Television interface 335 of FIG. 3 may serve to output a signal to a television (or another form of display device) in a proper format for display of video and playback of audio. As such, television interface 335 may output one or more television channels, stored television programming from storage medium 325 (e.g., television programs from DVR database 345, television programs from on-demand programming 330 and/or information from EPG database 330) to a television for presentation. Television interface 335 may also serve to output a CVM.

Still referring to FIG. 3, digital Video Recorder (DVR) functionality may permit a television channel to be recorded for a period of time. DVR functionality of television receiver 300 may be managed by control processor 310-1. Control processor 310-1 may coordinate the television channel, start time, and stop time of when recording of a television channel is to occur. DVR database 345 may store information related to the recording of television channels. DVR database 345 may store timers that are used by control processor 310-1 to determine when a television channel should be tuned to and its programs recorded to DVR database 345 of storage medium 325. In some embodiments, a limited amount of storage medium 325 may be devoted to DVR database 345. Timers may be set by the television service provider and/or one or more users of television receiver 300.

DVR database 345 of FIG. 3 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 300 via the television provider's network. For example, in a satellite-based television service provider system, data necessary to create the provider-defined timers at television receiver 150 may be received via satellite.

Still referring to FIG. 3, as an example of DVR functionality of television receiver 300 being used to record based on provider-defined timers, a television service provider may configure television receiver 300 to record television programming on multiple, predefined television channels for a predefined period of time, on predefined dates. For instance, a television service provider may configure television receiver 300 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 325 for provider-managed television programming storage.

On-demand programming database 327 of FIG. 3 may store additional television programming. On-demand programming database 327 may include television programming that was not recorded to storage medium 325 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 327 may be the same for each television receiver of a television service provider. On-demand programming database 327 may include pay-per-view (PPV) programming that a user must pay and/or use an amount of credits to view. For instance, on-demand programming database 327 may include movies that are not available for purchase or rental yet. Typically, on-demand programming is presented commercial-free.

Referring back to tuners 315 of FIG. 3, television channels received via satellite (or cable) may contain at least some scrambled data. Packets of audio and video may be scrambled to prevent unauthorized users (e.g., nonsubscribers) from receiving television programming without paying the television service provider. When a tuner of tuners 315 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 300 may use decryption engine 361 of security device 360 to decrypt ECMs. Decryption of an ECM may only be possible if the user has authorization to access the particular television channel associated with the ECM. When an ECM is determined to correspond to a television channel being stored and/or displayed, the ECM may be provided to security device 360 for decryption.

When security device 360 of FIG. 3 receives an encrypted ECM, security device 360 may decrypt the ECM to obtain some number of control words. In some embodiments, from each ECM received by security device 360, two control words are obtained. In some embodiments, when security device 360 receives an ECM, it compares the ECM to the previously received ECM. If the two ECMs match, the second ECM is not decrypted because the same control words would be obtained. In other embodiments, each ECM received by security device 360 is decrypted; however, if a second ECM matches a first ECM, the outputted control words will match; thus, effectively, the second ECM does not affect the control words output by security device 360. Security device 360 may be permanently part of television receiver 300 or may be configured to be inserted and removed from television receiver 300, such as a smart card, cable card or the like.

Tuning management processor 310-2 of FIG. 3 may be in communication with tuners 315 and control processor 310-1. Tuning management processor 310-2 may be configured to receive commands from control processor 310-1. Such commands may indicate when to start/stop receiving and/or recording of a television channel and/or when to start/stop causing a television channel to be output to a television. Tuning management processor 310-2 may control tuners 315. Tuning management processor 310-2 may provide commands to tuners 315 that instruct the tuners which satellite, transponder, and/or frequency to tune to. From tuners 315, tuning management processor 310-2 may receive transponder streams of packetized data.

Descrambling engine 365 of FIG. 3 may use the control words output by security device 360 in order to descramble video and/or audio corresponding to television channels and/or home automation functions for storage and/or presentation. Video and/or audio data contained in the transponder data stream received by tuners 315 may be scrambled. Video and/or audio data may be descrambled by descrambling engine 365 using a particular control word. Which control word output by security device 360 to be used for successful descrambling may be indicated by a scramble control identifier present within the data packet containing the scrambled video or audio. Descrambled video and/or audio may be output by descrambling engine 365 to storage medium 325 for storage (in DVR database 345) and/or to decoder module 333 for output to a television or other presentation equipment via television interface 335.

In some embodiments, the television receiver 300 of FIG. 3 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 300 may be configured to reboot at random times during the night in order to allow for installation of updates. Thus, an intruder is less likely to guess the time when the system is rebooting. In some embodiments, the television receiver 300 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer system 700 of FIG. 7.

While the television receiver 300 has been illustrated as a satellite-based television receiver, it is to be appreciated that techniques below may be implemented in other types of television receiving devices, such a cable receivers, terrestrial receivers, IPTV receivers or the like. In some embodiments, the television receiver 300 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 300 may be performed by an overlay device. If such an overlay device, television programming functions may still be provided by a television receiver that is not used to provide home automation functions.

Figure 4:
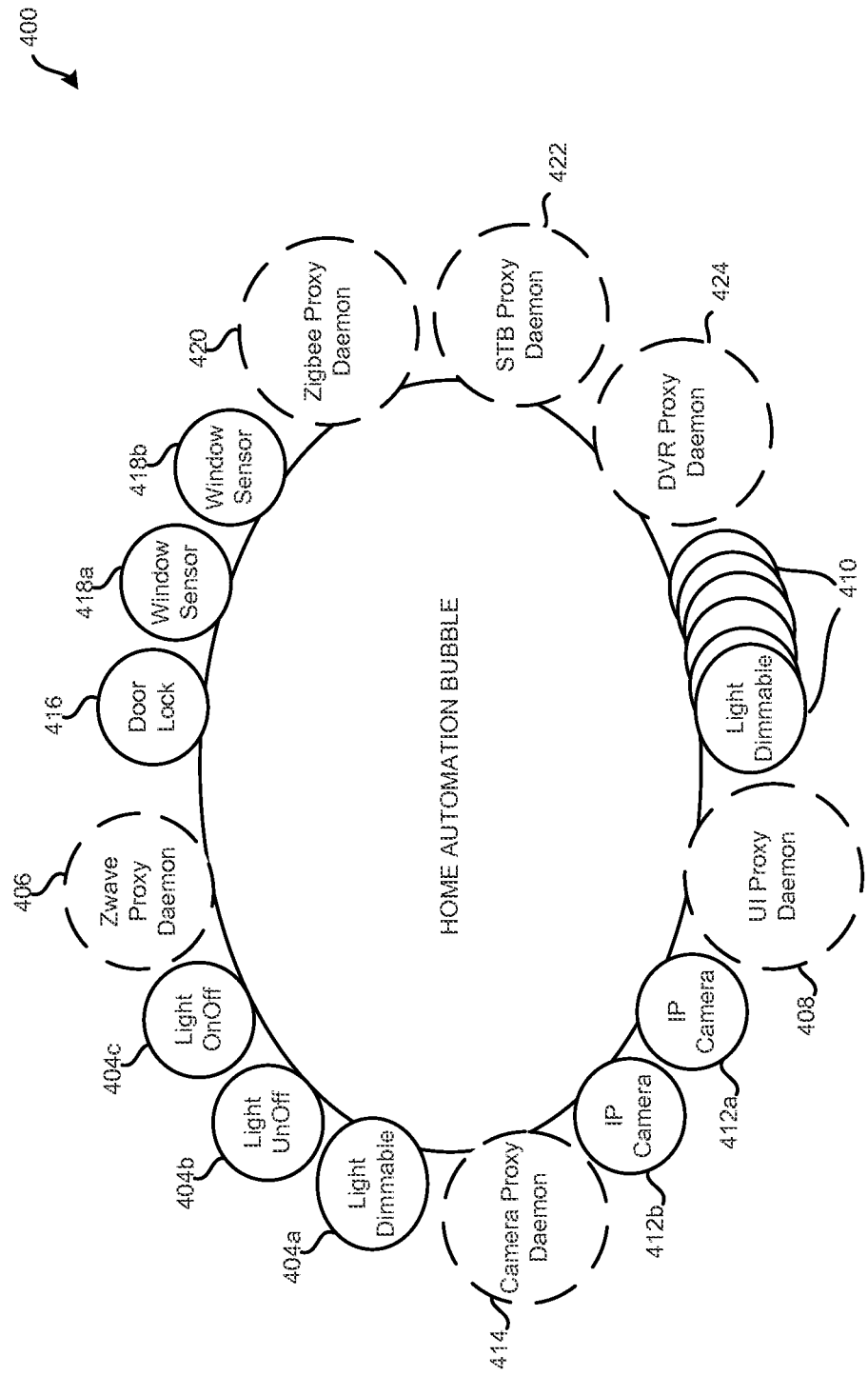
FIG. 4 shows a schematic diagram of a home automation controller implementing a bubble architecture.

Turning now to FIG. 4, a schematic diagram of a home automation controller 400 implementing a software bubble architecture 402 is shown. Specifically, the bubble architecture 402 may be implemented by the home automation engine 311, which may be provided for by the television receiver 150 and/or the overlay device 311 as described above in FIG. 2. Further, as shown in FIG. 3, the bubble architecture 402 described herein may be provided for in the control processor 311 and/or the storage medium 325 of the television receiver 300. It is contemplated that the home automation controller 400 may be downloaded or otherwise installed onto the television receiver 150, overlay device 311, and/or any other home automation gateway device, for example, through a WiFi connection and/or through satellites as transmitted home automation function signals from the television service provider system 110 of FIG. 1. In some aspects, software updates for the home automation controller 400 and/or various components of the bubble architecture 402 may be released, pushed, or requested from the television service provider system 110 through the satellites or other communications methods. Other examples are possible.

As shown in FIG. 4, the bubble architecture 402 may support a plurality of different devices, such as, and not limited to, any of the plurality of in-home home automation devices shown in FIG. 2. For instance, the bubble architecture 402 may be in operative communication with various light controllers 404a-c, which may be similar to the light controller 220 discussed above and provide control functions for dimming (light controller 404a) and on/off states (light controllers 404b,c) of one or more lighting devices. Such light controllers 404a-c may communicate with the bubble architecture 402 through Z-Wave® protocol, which can be facilitated by protocol-specific background software applications such as a Z-Wave® proxy daemon 406 provided for by the home automation engine 311 and/or integrated within the bubble architecture 402 itself. In another example, as shown in FIG. 4, a user interface ("UI") proxy daemon 408 in operative connection with other light controllers 410, such as controllers provided by a user interface, may be operatively connected to the bubble architecture 402. It is contemplated that the light controllers 410 may communicate with any of the light controllers 404a-c via the bubble architecture 402, and/or any other devices connected thereto, as discussed further below.

Further, by way of example, the bubble architecture 402 of the home automation controller 400 of FIG. 4 may be operatively connected to one or more cameras 212, such as internet protocol ("IP") cameras 412a,b, which may be facilitated by a camera proxy daemon 414. A door lock 416 and window sensors 418a,b, such as the lock controller 230 and window sensors 210 described above, may be integrated in the home automation controller 400, along with a ZigBee® proxy daemon 420. A television receiver or set-top-box proxy daemon 422 may be provided for or in operative communication with the bubble architecture 402, such that home automation controller 400 may interact with the television receiver 150. A DVR proxy daemon 424 may be provided for facilitating communication and operation with a DVR. In an aspect, FIG. 4 illustrates a home automation system whereby various different devices and communication standards may be integrated and controlled by the home automation controller 400 having the bubble architecture 402 described herein.

It is noted that the proxy daemons 406,408,414,420,422, 424 and/or proxy managers disclosed herein, as discussed further below, are data structures that include processes for controlling device proxies. In practice, the bubble architecture 402 of FIG. 4 may integrate the plurality of different automation devices and their various communication standards to operate in harmony in the home automation system. Further, the bubble architecture 402 may provide for enhanced monitoring of various statuses of the devices and manage such monitored statuses across various user interface platforms that are operatively connected to the bubble architecture 402. Such monitored statuses may be communicated efficiently and consistently within, and outside of, the bubble architecture 402 to ensure that various interfaces, such as user interface ("UI") webpages, overlays, and mobile apps in communication with the bubble architecture 402 are up-to-date and consistent with the status of each device. In doing so, the bubble architecture 402 may reduce interactions of the devices from complex interactions to simplified interactions that permit control and understanding of the devices within the bubble 402. In this way, the bubble 402 provides for a simplified monitoring, viewing and managing of all in-home devices connected thereto, as described in the succeeding paragraphs.

Figure 5:
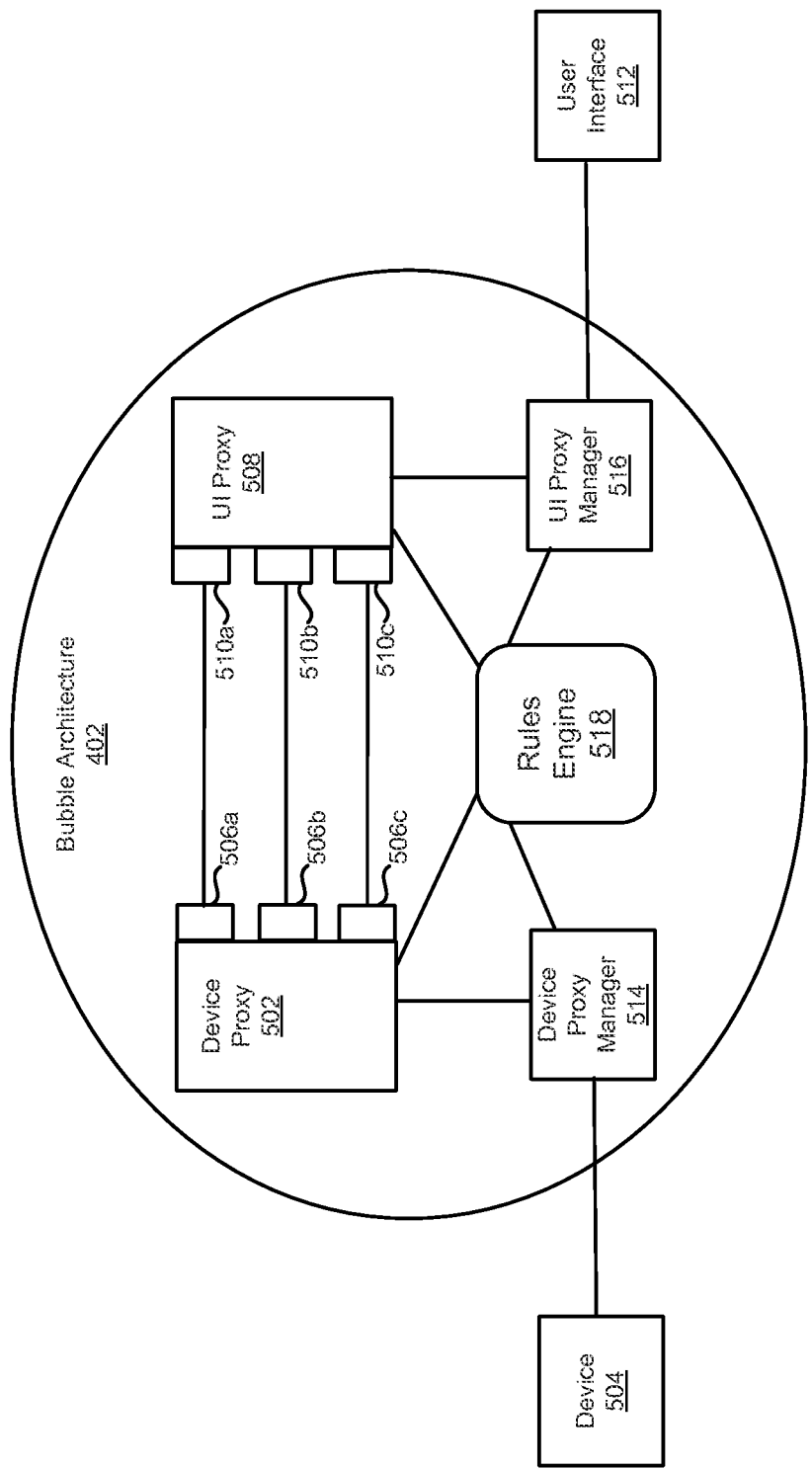
FIG. 5 shows a schematic diagram of a home automation bubble architecture.

Turning now to FIG. 5, a schematic diagram showing example components of the bubble architecture 402 is provided. The bubble architecture 402 may include, for each device connected thereto, a device proxy 502 representative of the device, e.g. device 504. In practice, the device proxy 502 permits the controller 400 to monitor and control the physical device 504. The device proxy 502 may include one or more value containers or boxes 506a-c, which may be buckets representing details or data relating to the device 504 that are pertinent to operation of the bubble architecture 402 overall, e.g. sensor data, controls, and/or metadata. For instance, the physical device 504 may be a thermostat having a sensor that detects a current temperature value; controls including various modes such as cool or heat, on or auto, on or off, fan or air conditioning, cool temperature setting value or value range, heat temperature setting or value range; metadata, such as make, model, network identification ("ID"). Other data types are possible. Each box 506a-c may store any or all data types of the device 504 therein for the device proxy 502. Merely by way of example, box 506a may represent an on or off control status, box 506b may represent an open or closed control status, and box 506c may represent a name, such as a user-generated or friendly name, for the device 504. In other examples, each box may represent a number within a range, a value that is displayed on a wall panel liquid-crystal display ("LCD") or other display screen, and/or other data types.

It is noted that any number of boxes may be provided for a device proxy at any time, and that boxes may be updated, deleted, and/or added in real-time or throughout implementation of the bubble architecture 402 by the bubble architecture 402 itself, by the home automation engine 311, and/or in response to home automation functions received through satellite. Other examples are possible. Further, it is noted that the bubble architecture 402 may include any number of device proxies for a plurality of devices, such that the bubble architecture 402 maintains a list of proxies having real-world, current state sensor and/or control values at each box for each proxy. For instance, an additional proxy as shown in FIG. 5 may be a user interface proxy 508 including any number of boxes, such as boxes 510a-c, provided and representative of a user interface 512. In one example, data types to be stored in boxes may be selected based on relevancy to the bubble architecture 402 and other devices connected thereto, such that low-level or otherwise less important details and data from the physical devices are not included in to provide a simple, less complex architecture. Here, in an example implementation, boxes 510a-c are reflective of values shown in boxes 506a-c, with the UI proxy 508 being a mirrored device proxy for the device 504. In this case, the user interface 512, which may be provided on a wireless device for the user or other display screen, may provide relevant information from the device 504. Other examples and types of proxies are possible.

As shown in FIG. 5, the bubble architecture 402 may further include one or more proxy managers, such as a device proxy manager 514 and a UI proxy manager 516. A proxy manager may be a code that is responsible for communication details, such as a particular type of communication method (i.e., ZigBee® or Z-Wave®) for each device proxy, and/or is responsible for functions of particular devices. Further, proxy managers may include value boxes, whereby the value boxes may be connected to boxes on device proxies via simple one-to-one rules. Further, a single proxy manager may facilitate a plurality of device proxies having commonality. For instance, some device proxies may utilize a same or similar type of communication network, and/or provide similar functions. In that case, a common proxy manager may be implemented among such devices. In another aspect, a proxy manager may include code that is responsible for creating new proxies and/or boxes, and adding such new proxies and boxes to the bubble architecture 402 for further use in the controller 400. In a further aspect, a proxy manager may be responsible for adding rules related to the proxies and/or boxes to a rules database. Other examples and functions are possible.

In one example, the device proxy manager 514 may be a proxy manager that primarily represents a real device. Turning back to FIG. 4, the camera proxy daemon 414, Z-Wave® proxy daemon 406, ZigBee® proxy daemon 420, STB proxy daemon 422, and the DVR proxy daemon 424 may be possible examples of such proxy managers. The UI proxy manager 516 may be a proxy manager that primarily represents a user's view of device(s), e.g. device 504. In another example, a home automation JSON UI proxy manager may be provided for connecting various UI devices to the bubble architecture 402. Such UI devices, which provide user views, may include a local Hopper® UI client of a main television receiver, a LAN-via-MoCA connected Joey® client of a secondary television receiver connected to the main receiver, a LAN-via-WiFi connected mobile device that may be within range of a local WiFi network, a smart phone, a smart wristwatch, an electronic panel controller having a display screen, and/or other mobile devices connected remotely via a cloud server.

In another example, a proxy manager may include a ZigBee® proxy manager that connects home automation and security devices communicating through ZigBee® to the bubble architecture 402. Various devices may include door locks, radio modules, light switches and/or doorbell devices, among others. A Z-Wave® proxy manager may connect home automation and security devices communicating through Z-Wave® to the bubble architecture 402. Such devices may include, but are not limited to, lamp and appliance modules (e.g., in a lamp socket or plugged directly to a wall), thermostats, door and/or window sensors, and others. As further examples, an IP camera control proxy manager may be provided to connect IP cameras that communicate using ONVIF® standards to the bubble architecture 402, a STB notification proxy manager may connect set-top-box notification controls offered by a television receiver, such as the Hopper®, to the bubble architecture 402, and a DVR proxy manager may connect various DVR and streaming device services offered by the television receiver to the bubble architecture 402, whereby camera channels, requesting recordings, and other services may be linked via the bubble architecture 402. It is contemplated that a single proxy manager may support more than one device and/or device proxy at a time. Other examples are possible.

Referring again to FIG. 5, a rules engine 518 may be provided in the bubble architecture 402, and/or in operative with various components of the bubble architecture 402. The rules engine 518 may include a plurality of rules, which may be stored in a rules database, such as in the bubble architecture 402, the home automation settings database 347, and/or the home automation script database 348 shown in FIG. 3. Such rules may be created by one or more proxy managers, for instance upon addition of a new device proxy and/or boxes to the bubble architecture 402, from an external device or service, and/or set-up by a user through a user interface. In one aspect, the rules engine 518 may be responsible for controlling values in boxes of device proxies, so that any changes are visible to other proxies and proxy managers inside the bubble architecture 402. For example, upon detection of a change in the physical device 504, such as a change in temperature, the device proxy manager 514 may initiate the rules engine 518 to look up any rules related to a change in temperature, and implement such rules. One example rule may include changing a box 506a-b of the device proxy 502 and subsequently updating its corresponding mirrored box 510a-c of the UI proxy 508, so that the change is passed on to a webpage or other type of user interface linked thereto.

In another example, the rules engine 518 may include a rule that links various physical devices 504 to states of other devices. Merely by way of example, the rule may include linking a ZigBee® light switch having an on/off operational mode to a lighting device for control of that device, or to multiple lighting devices. In this way, one or more device proxies representing one or more lighting devices may be linked to the device proxy representing the ZigBee® light switch via the rule. For instance, upon detecting, by the lighting device proxy manager, a changed value of a box on the device proxy corresponding to the ZigBee® light switch, the lighting device proxy manager may determine via the rules engine 518 that a value on the lighting device proxy manager should be updated to reflect the change, and then update that value. Additionally and/or alternatively, the lighting device proxy manager may signal the actual lighting device to implement the changed value prior to changing the value of the box on the device proxy. It is contemplated that any values of any of the boxes may be automatically updated and/or pulled by any proxy managers. For instance, a device proxy manager may periodically check a health, accuracy, and/or up-to-date status of the device, as described further below. Other examples are possible.

In yet another example, a rule implemented by the rules engine 518 may include detecting a change in temperature during a particular time period, such as a summer afternoon, and automatically closing blinds on a south side of a house. In another example, the rules engine 518 may cause doors of a house to lock at a certain time. In still another example, the rules engine 518 may trigger notifications to be sent to various devices via various communication networks. For instance, if the bubble architecture 402 determines that a motion sensor is activated, the bubble architecture 402 may trigger cameras to record, send notification messages to mobile phones and/or television screens, and/or stream audio and/or video recordings to such wireless devices, as required by the rules engine 518. In still other examples, rules may call for and/or include algorithms for determining a reactive state of another device. For instance, the rule may compare an amount of rainfall that was measured, determine a declining average of rain, and determine an amount and/or frequency of water delivery by a sprinkler device to water a lawn.

It is contemplated that the rules engine 518 facilitates the bubble architecture 402 to be reactive through relatively simple and/or more complex rules. For instance, when a value in a box is written, a rule may be triggered to cause the value to be reflected in another box and/or the change may trigger one or more other devices to take action. In another example, a device proxy may set one of its boxes to a new value, i.e. set a sensor to a new value within the bubble architecture 402. In response, the rules engine 518 may determine if there are one or more rules associated with that box, i.e. associated with the sensor represented by the box. If there is a rule, the rule is run by various proxy managers and/or device proxies. Multiple events may occur from a single rule being triggered. Further, the bubble architecture 402 may send changed values to all user interfaces of concern, such that all user interfaces reflect the change. In still other examples, the rule may initiate scenes or modes, whereby the UI proxy 508 controls several different device proxies and sets custom values in the boxes of the device proxies. It is noted that FIG. 5 illustrates various communication links or pathways between various components, although any of the links may be optional, and any component may communicate with any other component although such links may not be explicitly shown. For instance, the device proxy manager 514 may communicate with the UI proxy 508. Further, it is noted that any number of device proxies, device proxy managers, rules engines, and/or value boxes may be provided within the bubble architecture 402.

Figure 6:
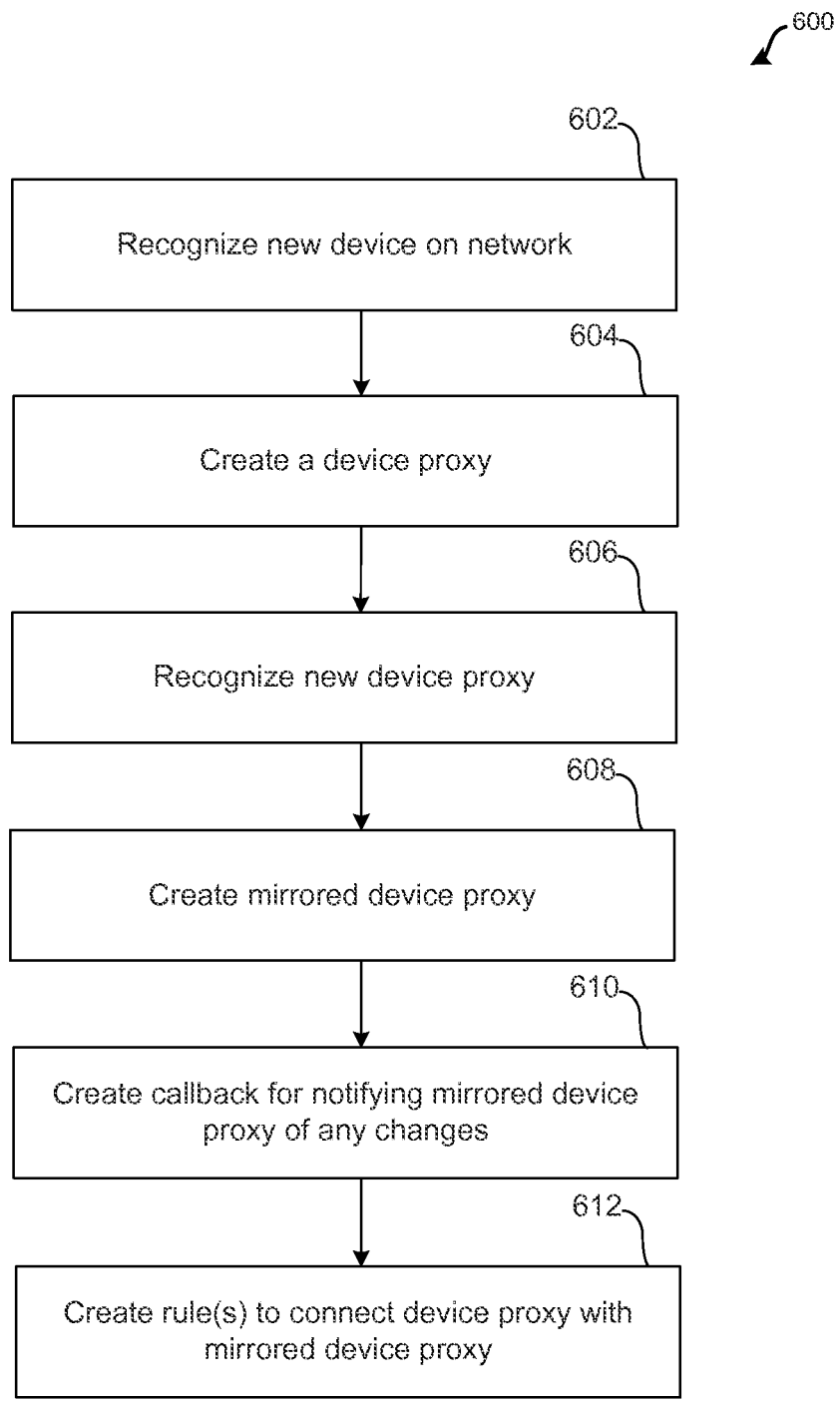
FIG. 6 shows a flow diagram of an example method of the bubble architecture creating a mirrored proxy.

Turning now to FIG. 6, a flow diagram showing an example method 600 of the bubble architecture 402 adding a new proxy and mirrored proxy is provided. The method 600 may comprise recognizing, by the bubble architecture 402, a new device on its network (step 602). In an example, a device proxy manager may recognize the new device on its network. In response to recognizing the new device, the bubble architecture 402 may create a new device proxy, e.g. device proxy 502 of FIG. 5, and/or add the new device proxy to the bubble architecture 402 (step 604). In some examples, this may also be performed by the device proxy manager of the bubble architecture 402. Next, the bubble architecture 402 may recognize or otherwise acknowledge the new device proxy added thereto. For instance, a user interface UI proxy manager may detect, be notified, or otherwise learn about the new device proxy added on the bubble architecture 402 (step 606). In response to recognizing the new device proxy, the bubble architecture 402 may create a mirrored device proxy, e.g. UI proxy 508 of FIG. 5, based on the new device proxy and/or add the mirrored device proxy to the bubble architecture 402 (step 608). In some examples, the mirrored device proxy may be created by the UI proxy manager. The bubble architecture 402, and/or more specifically, the UI proxy manager, may further create a callback or message address for the bubble architecture 402 to notify the mirrored device proxy of any changes, for instance, any value changes in boxes of the original device proxy (step 610). The bubble architecture 402 may connect the boxes, i.e. sensors and controls, in its mirrored device proxy with boxes in the original device proxy by creating and/or adding simple, one-to-one rules (step 612). This step may be performed by the UI proxy manager. It is noted that any of the steps may be performed by any of the components in the bubble architecture 402 and are not limited to the examples provided herein.

Figure 7:
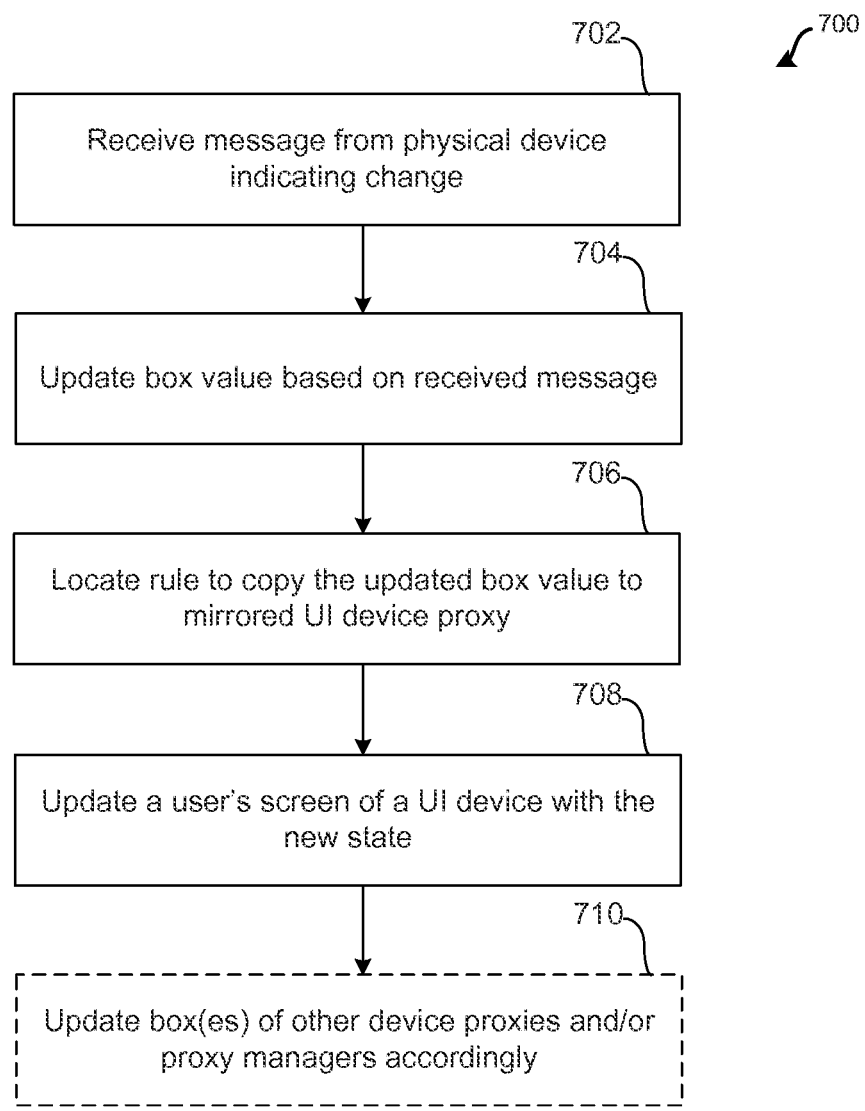
FIG. 7 shows a flow diagram of an example method of the bubble architecture for updating a user interface screen.

Turning now to FIG. 7, a flow diagram showing another example method 700 of the bubble architecture 402 for updating a user interface screen in response to a change in a device is provided. The method 700 may comprise receiving, by the bubble architecture 402, a message from an actual physical device connected thereto that a change has been made (step 702). The message may be relayed via a home network communication protocol, such as any of the networks mentioned herein, and/or received by a device proxy manager representing the physical device in the bubble architecture 402. Merely by way of example, the physical device may be a lamp module that user has turned "on" using a built-in, physical button at the lamp module, thereby generating the message. In response to receiving the message, the bubble architecture 402, and/or more specifically the device proxy manager, may instruct the device proxy, e.g. device proxy of the lamp module, to set an appropriate box of the device proxy to a value representing that relayed message, e.g. change a box value to "on" within the bubble architecture 402 (step 704). Subsequently, the bubble architecture 402 may look up, via rules engine 518 and/or otherwise within the rules database, to locate any rule(s) to trigger. In the present example of FIG. 7, the rule may include copying the updated box value to a corresponding box on a mirrored UI device proxy (step 706).

In turn, the bubble architecture 402, or more specifically the rules engine 518 and/or the mirrored UI device proxy, may notify, via the relayed message and/or a callback, the UI device proxy and/or the UI device proxy manager that the rules engine 518 has changed contents of the mirrored box. In response, the bubble architecture 402 may update a user screen of a user interface device connected thereto to reflect the new state of the device (step 708). Such updates may be implemented, for instance, by the UI device proxy and/or the UI device proxy manager and may include, merely by way of example, updating a numerical value on the user screen, updating with the relayed message, translating the relayed message into a user-friendly message to update the screen, triggering other notification actions, such as lights and/or sounds, additionally and/or alternatively with updating the user's screen, and other possibilities. Further, in some aspects, other device proxies and/or device proxy managers may update their respective boxes with new values depending on the message and/or any rules associated with the sensors (step 710). It is noted that step 710 may be optional. Further, it is noted that any of the steps presented in any of the methods may be optional, rearranged, and/or include other steps not explicitly shown.

Still referring generally to FIG. 7, other examples methods related to receiving new values at the bubble architecture 402 from attached devices may be contemplated. In one example, a new temperature value may be received from a sensor at a thermostat through a Z-Wave® network connection. The new temperature value may be received by a device proxy manager, such as the Z-Wave® device proxy manager and/or Z-Wave® daemon. The Z-Wave® device proxy manager may look up a device proxy for the thermostat and fill in a new value in a box of the thermostat device proxy, thereby updating the bubble architecture 402 with the new value. The rules engine 518 may be triggered to fill in a new value at a UI proxy manager (or UI proxy). In response, the UI proxy (or UI proxy manager) may be notified by the rules engine or the proxy manager of the new value and in response, create a message, e.g. JSON message, to send to attached UI devices.

Figure 8:
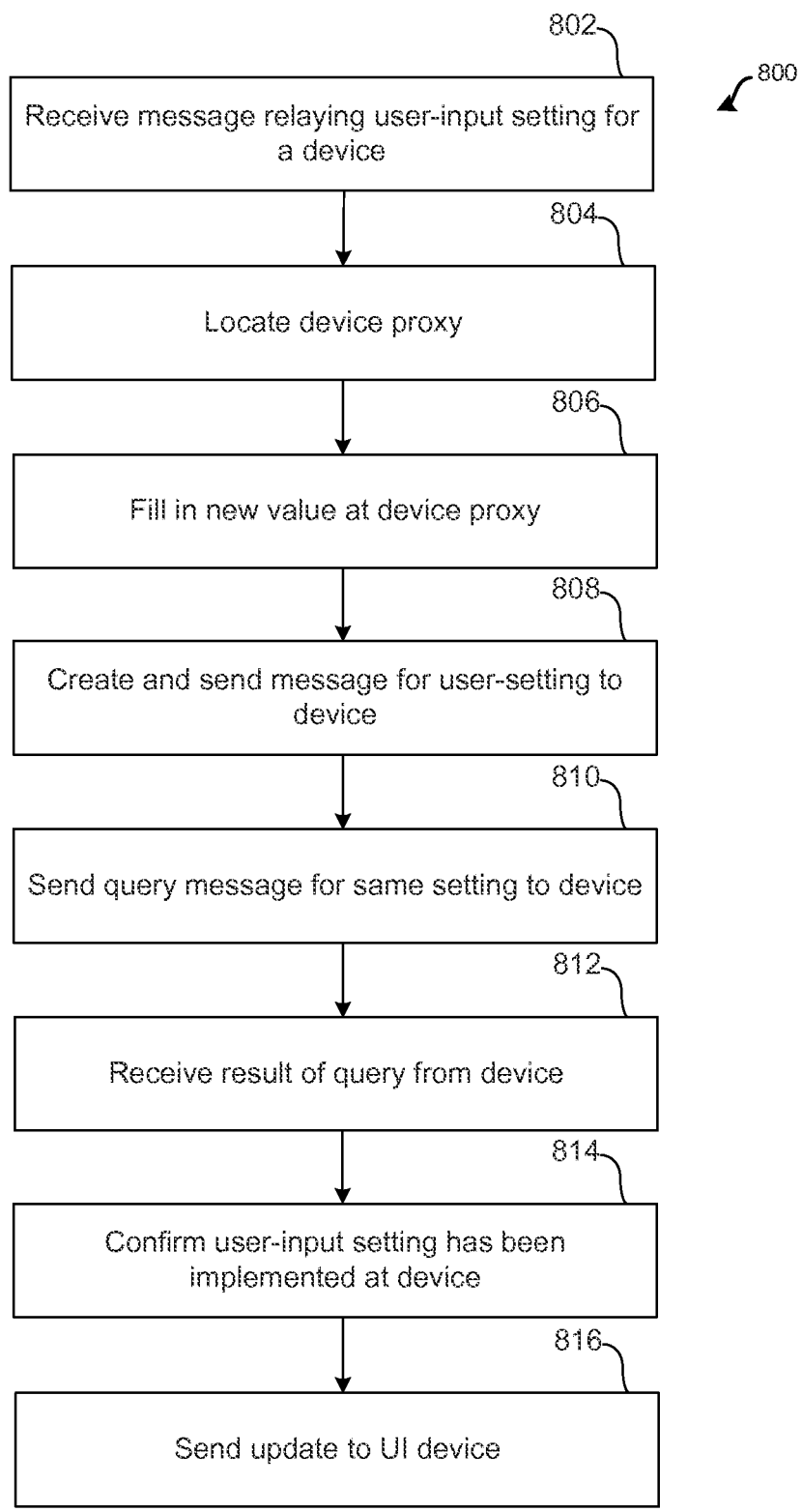
FIG. 8 shows a flow diagram of an example method of the bubble architecture for implementing a changed user setting.

Referring now to FIG. 8, a flow diagram for yet another example method 800 for updating the bubble architecture 402 in response to a changed user setting of an attached device is shown. Any of the steps being shown may be optional, rearranged, and/or include any other steps not explicitly shown. Further, it is noted that any components of the bubble architecture 402 may provide any of the steps being shown in method 800.

The method 800 may include receiving, at the bubble architecture 402, a message regarding a user-input setting for a device (step 802). In some aspects, the message may be received by a UI proxy manager of the bubble architecture 402 from a user input device in connection with the bubble architecture 402, and/or more specifically connected to the UI proxy manager. Merely by way of example, the user-input setting may include a new temperature setting for a thermostat. The bubble architecture 402 may locate a device proxy for the device (step 804). For instance, the UI proxy manager may be triggered to locate the device proxy. Thereafter, or about at the same time, the bubble architecture 402 may fill in a new value at the device proxy, whereby the new value is based on the message for the user-input setting (step 806). In some aspects, the rules engine 806 may be triggered to fill in the new value at the device proxy. The bubble architecture 402 may further create a message for the user-setting and send the message to the physical device (step 808). It is contemplated that the device proxy and/or the device proxy manager may create the message and/or relay the message, via the appropriate communication protocol, to the device.

After sending the message to the device, the bubble architecture 402 may create and send a query message for the same setting to the device in a similar manner (step 810). In this case, the device proxy may perform a "set value" request from the bubble architecture 402 in two parts: send an actual ZigBee® or Z-Wave® message out to the physical device, and follow-up that message with a query of that device's current state. The bubble architecture 402 may then receive a result from the device (step 812), whereby the result may be a current state message. The bubble architecture 402 may interpret the received result as an update from the actual device and/or using the result, confirm that the user-input setting has been implemented at the device by comparing the current state message to see if there is match with the desired user-input setting (step 814). In some examples, the device proxy may fill in a new value on a read-control box of the device proxy upon receiving the result of the query. Thereafter, the bubble architecture 402 may propagate the updated state through the bubble architecture 402 and the rules engine 518 for visibility to any other proxies, such as mirrored proxies. For instance, the rules engine may be triggered by the bubble architecture 402 to fill in a new value at a UI device proxy and/or UI device proxy manager. Further, and merely by way of example, the bubble architecture 402 may send an update to a UI device regarding the new value (step 816) to update a display on the UI device. It is contemplated that the set value request may ensure that a user's desired change to a state of the device is propagated and affected consistently among real world controls, read/write devices which may take time to accept new states, and and/or the real world devices that may sometimes fail to accept new states.

Figure 9:
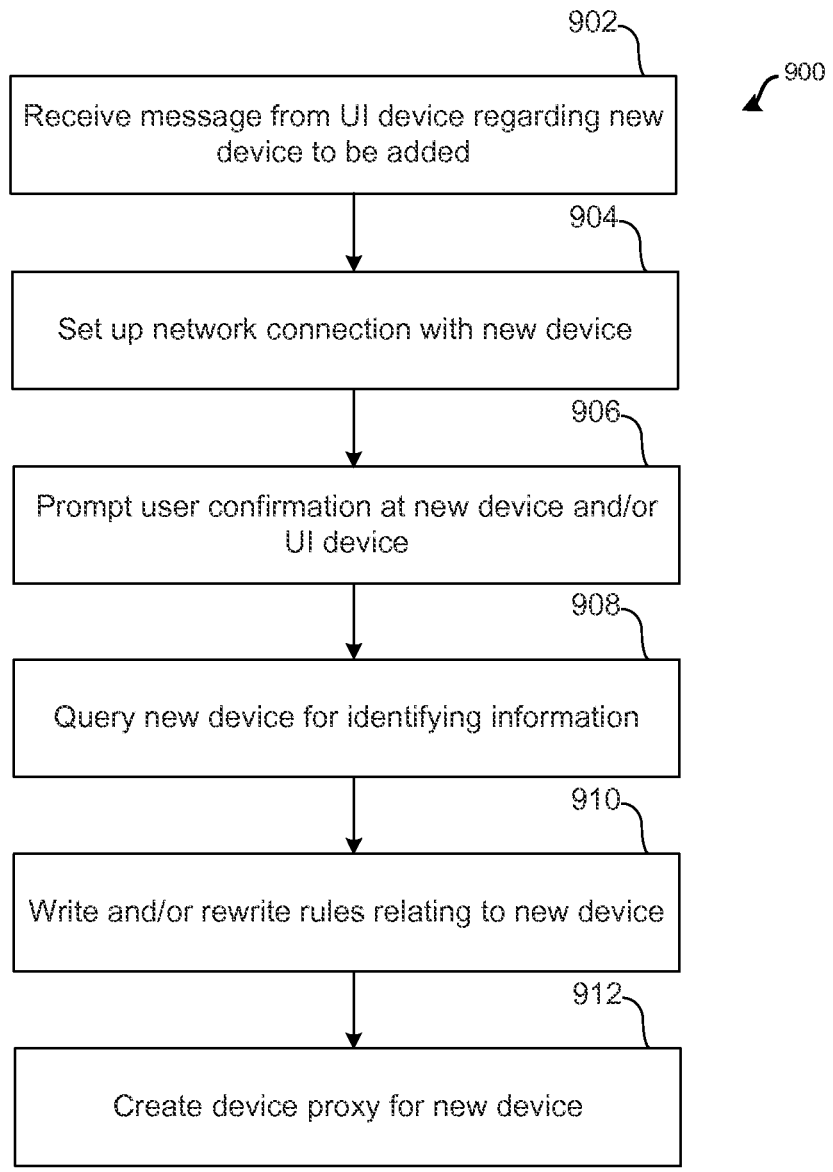
FIG. 9 shows a flow diagram of an example method of the bubble architecture for integrating a new device.

Turning now to FIG. 9, a flow diagram showing yet another method 900 for integrating a new device at the bubble architecture 402 is provided. The method 900 may comprise receiving, by the bubble architecture 402, a message regarding a new device to be added (step 902). Merely by way of example, the message may be sent by a UI device upon receiving user input for adding the new device and sent to the UI device proxy at the bubble architecture 402. The message may include further details regarding the new device, such as details pulled from an installation database about the device and/or include a network type of the device, such as ZigBee® or Z-Wave® details.

In response to receiving the message at the bubble architecture 402, the bubble architecture 402 may initiate set-up of a network connection with the new device (step 904). In one example, the bubble architecture 402, and/or the UI device proxy thereof, may look up a proxy for a network type on the bubble architecture 402. The bubble architecture 402 may look up the network-type proxy in a similar manner as it determines a device proxy, such as for lights or locks, only in this instance for a particular network connection. Upon identifying the network-type proxy, the bubble architecture 402, and/or more particularly the UI device proxy, may set a mirrored box on the UI device proxy to add the network in an "include" mode. After setting the mirrored box at the UI device proxy to include the network, the bubble architecture 402 may trigger the rules engine 518 to copy a "set" mode to the network-type proxy. Thereafter, the bubble architecture 402, for example via the network-type proxy, may send or otherwise notify an actual controller of the network connected to the network-type proxy that the new device has been added to the network, or instruct the actual controller to add the new device to the network at the controller. An "include" mode or state may be received by the bubble architecture 402 from the network controller. For example, the updated include state may be returned to the bubble architecture 402 and specifically to the UI device proxy, which may utilize the "set value" request as described in regard to FIG. 8.

In response to receiving the updated include state and/or notifying the actual network controller that the new device is to be added to the network, the bubble architecture 402 may prompt a user confirmation at the new device and/or the UI device (step 906). For example, the bubble architecture 402 may cause the UI device to display a request for a user to press an "include" or similar button on the UI device and/or the new device. Upon receiving indication from the UI device and/or the new device that the user has confirmed installation of the device, the bubble architecture 402 may further query the new device for identifying information, such as a manufacturer ID and/or a product ID (step 908). The bubble architecture 402 may add the queried information or other device details to a network proxy sensor, which may be a proxy on the bubble architecture 402 that includes a list of new devices. Further, the bubble architecture 402, and/or more specifically the rules engine 518, may write the newly listed entries to the UI device proxy to setup one or more rules relating the new device to the UI device proxy, and/or to other proxies in the bubble architecture 402. The UI device proxy may analyze the new list entry and/or the rules.

In one aspect, if the UI device proxy does not recognize the device details, such as the manufacturer ID and/or the product ID, the UI device proxy may instruct the bubble architecture 402 to prompt the user on whether the new device is to be added as an unknown device or otherwise special device. Further, the bubble architecture 402 may ask the user, via the UI device, and/or the network-type proxy, to associate the new device with another known device of a similar type that is already recognized by the UI device proxy. In a different example, the UI device proxy may recognize the device details, and in response determine that the device is not an expected device to be added to the network. In that case, the bubble architecture 402 may notify the user that the new device is not an expected device and/or may seek for, via the UI device, user confirmation to add and/or remove the device from the network. In yet another example, the UI device proxy may recognize the device details as expected device. In that case, the bubble architecture 402, and/or more specifically the UI device proxy, may write the device details, including a universally unique identifier ("UUID") of the new device, to its mirror of the network type proxy at an "accept new device" box. The bubble architecture 402, and/or more specifically the rules engine 518, may copy the mirrored box to the network-type proxy. The bubble architecture 402, and/or more specifically the network-type proxy, may remove the new device from the list of new devices on the network proxy sensor, create a new device proxy for the new device (step 912), and/or add the new device proxy to a list of proxied devices maintained by the bubble architecture 402.

Further aspects of the bubble architecture 402 may be contemplated. For instance, the bubble architecture 402 may store additional private data or keys for proxies, e.g. network node ID, so that a proxy manager may use such data to locate a correct proxy by searching for such keys. In general, it is contemplated that the bubble architecture 402 described herein may store information that permits for configuration and control of individual home automation devices which may operate using various protocols. In doing so, the bubble architecture 402 may create a proxy for each device that permits settings for the device to be passed through a user interface, e.g. presented on a television screen, in order to allow for settings to be solicited for and collected via a user interface, e.g. a UI presented by the television receiver and/or overlay device described above. Such received settings may be handled by various proxies specific to the protocol of the device, thereby permitting the settings to be passed on to the various devices. Further, when a proxy sets a sensor to a new value in the bubble architecture 402, the rules engine may look to see if there are any rules associated with that sensor. If there are, the rules may be run. An example rule may be to copy the box value on the device proxy to a mirrored box value on a mirrored UI proxy. It is contemplated that this arrangement may allow for settings to be collected and/or received via a UI of the television receiver and/or overlay device and allow for settings to be passed to appropriate home automation devices, and/or used for managing the appropriate home automation device. Other examples are possible.

A computer system as illustrated in FIG. 7 may be incorporated as part of the previously described computerized devices, such as the wireless devices, television receivers, overlay devices, communication devices, any of the home automation devices, the television service provider system, etc. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 10:
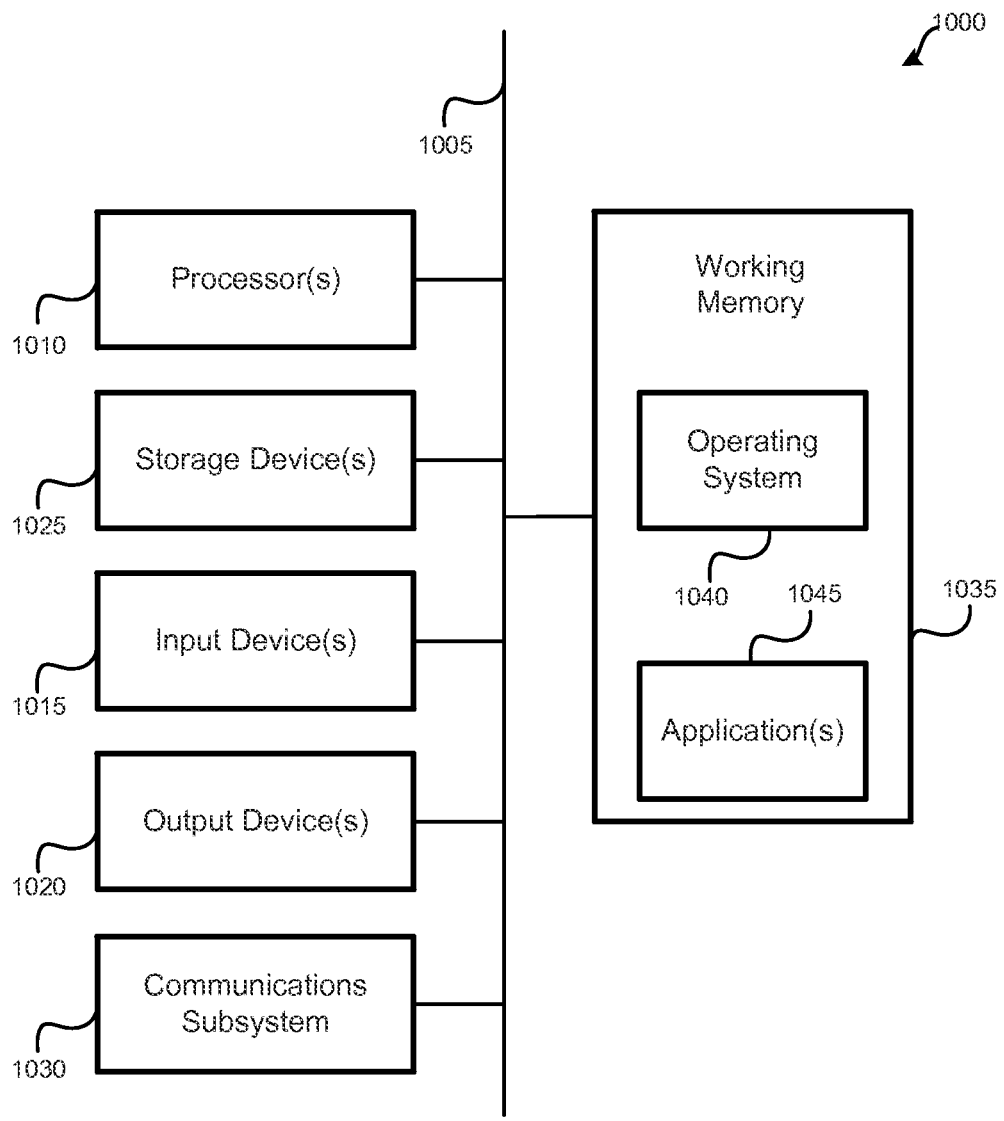
FIG. 10 shows an embodiment of a computer system upon which various aspects of the present disclosure may be implemented.

Turning now to FIG. 10, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for controlling a plurality of devices in a home automation system, comprising:
providing, by a home automation controller incorporated as part of a television receiver, a device proxy for a device in communication with the home automation system, wherein the device proxy comprises a plurality of value containers, each value container of the plurality of value containers corresponding to a sensor output value or control value of the device;

setting, by the home automation controller, a new value in a value container of the plurality of value containers of the device proxy;
determining, by the home automation controller, one or more rules associated with the device proxy;
running, by the home automation controller, the determined one or more rules, wherein:
the determined one or more rules are indicative of interactive relationships between the device proxy, one or more other device proxies corresponding to one or more other home automation devices in communication with the home automation controller, and a user interface (UI) proxy; and
the UI proxy is distinct from the device proxy and receives the new value from the device proxy based on the determined one or more rules;
updating, by the home automation controller, the one or more other device proxies corresponding to the one or more other home automation devices;
storing, by the home automation controller, the new value in a UI proxy value container of a plurality of UI proxy value containers, and
causing, by the home automation controller, the new value to be transmitted to one or more UI devices based on the UI proxy.

2. The method for controlling a plurality of devices in a home automation system of claim 1, comprising:
wherein the home automation controller comprises a television receiver.

3. The method for controlling a plurality of devices in a home automation system of claim 1, comprising:
connecting, by the home automation controller, the device proxy to a user interface ("UP") device proxy.

4. The method for controlling a plurality of devices in a home automation system of claim 3, comprising:
wherein the UI proxy is in operative communication with a UI device to allow for settings to be solicited for and collected via the UI device.

5. The method for controlling a plurality of devices in a home automation system of claim 4, comprising:
wherein the UI device comprises at least one of a television display screen, an overlay device, a mobile device, a smart wristwatch, and a webpage.

6. The method for controlling a plurality of devices in a home automation system of claim 3, comprising:
wherein the device proxy is connected to the UI proxy via the determined one or more rules.

7. The method for controlling a plurality of devices in a home automation system of claim 6, comprising:
further wherein running the determined one or more rules comprising updating, by the home automation controller, a UI value container value of the UI proxy to mirror the new value provided for in the value container of the device proxy.

8. The method for controlling a plurality of devices in a home automation system of claim 6, comprising:
relaying, by the home automation controller, a message to a UI device to update a user screen of the UI device based on the updated UI value container value.

9. The method for controlling the plurality of devices in the home automation system of claim 1, comprising:
storing, by the home automation controller, configuration information and control information of each of the plurality of devices in a home automations settings database.

10. The method for controlling a plurality of devices in a home automation system of claim 1, comprising:
receiving, by the home automation controller, a first setting for the device through a UI device proxy;
determining, by the home automation controller, a second device to control based on the determined one or more rules;
after determining the second device to control, automatically sending, by the home automation controller, a reactive setting to a second device proxy associated with the second device;
translating, by the home automation controller, the reactive setting into a protocol-specific action signal associated with a protocol required by the second device; and
sending, by the home automation controller, the translated reactive setting to the second device through a communications network connected to the protocol.

11. The method for controlling a plurality of devices in a home automation system of claim 10, comprising:
initially receiving, by the home automation controller, the determined one or more rules through a UI device proxy, wherein the one or more rules links the first setting of the device with the reactive setting of the second device.

12. The method for controlling a plurality of devices in a home automation system of claim 10, comprising:
receiving, by the home automation controller, a feedback signal from the second device through the communications network, wherein the feedback signal indicates a changed state of the second device.

13. The method for controlling a plurality of devices in a home automation system of claim 12, wherein:
the feedback signal is received at the second device proxy of the home automation controller.

14. The method for controlling a plurality of devices in a home automation system of claim 12, comprising:
after receiving the feedback signal from the second device, determining, by the home automation controller, a new value corresponding to the changed state of the second device as indicated by the feedback signal; and
triggering, by the home automation controller, a mirrored second device proxy associated with the second device to update a current value of the mirrored second device proxy to the new value.

15. The method for controlling a plurality of devices in a home automation system of claim 14, comprising:
determining, by the home automation controller, an additional reactive setting for an additional device proxy of an additional device based on the new value of the mirrored second device proxy; and
sending, by the home automation controller, the additional device setting to the additional device proxy to change a state of the additional device.

16. The method for controlling a plurality of devices in a home automation system of claim 10, comprising:
detecting, by the home automation controller, a change in at least one of the device and the second device; and
updating, by the home automation controller, at least one of the device proxy and the second device proxy with a new value based on the detected change.

17. The method for controlling a plurality of devices in a home automation system of claim 16, comprising:
wherein detecting the change comprises periodically checking, by the home automation controller, the device and the second device for a health status, an accuracy status, and an up-to-date status.

18. A television receiver having an incorporated home automation controller for controlling a plurality of devices in a home automation system, comprising:
one or more processors; and
a memory communicatively coupled with and readable by the one or more processors and having stored therein processor-readable instructions that, when executed by the one or more processors, cause the one or more processors to:
provide a device proxy for a device in communication with the home automation system, wherein the device proxy comprises a plurality of value containers, each value container of the plurality of value containers corresponding to a sensor output value or control value of the device;
set, by the home automation controller, a new value in a value container of the plurality of value containers of the device proxy;
determine one or more rules associated with the device proxy;
run the determined one or more rules, wherein:
the determined one or more rules are indicative of interactive relationships between the device proxy, one or more other device proxies corresponding to one or more other home automation devices in communication with the home automation controller, and a user interface (UI) proxy
update the one or more other device proxies corresponding to the one or more other home automation devices;
store the new value in a UI proxy value container of a plurality of UI proxy value containers, and
cause the new value to be transmitted to one or more UI devices based on the UI proxy.

19. A non-transitory computer-readable medium having stored thereon a series of instructions which, when executed by a processor of a television receiver, cause the processor to control a plurality of devices in a home automation system by:
providing a device proxy for a device in communication with the home automation system, wherein the device proxy comprises a plurality of value containers, each value container of the plurality of value containers corresponding to a sensor output value or control value of the device;
setting a new value in a value container of the plurality of value containers of the device proxy;
determining one or more rules associated with the device proxy;
running the determined one or more rules, wherein:
the determined one or more rules are indicative of interactive relationships between the device proxy, one or more other device proxies corresponding to one or more other home automation devices in communication with the home automation system and a user interface (UI) proxy; and
the UI proxy is distinct from the device proxy and receives the new value from the device proxy based on the determined one or more rules;
updating the one or more other device proxies corresponding to the one or more other home automation devices;
storing the new value in a UI proxy value container of a plurality of UI proxy value containers, and
causing the new value to be transmitted to one or more UI devices based on the UI proxy.

* * * * *

UNITED STATES PATENT AND TRADEMARK OFFICE
CERTIFICATE OF CORRECTION

PATENT NO. : 9,838,736 B2  
APPLICATION NO. : 14/565853  
DATED : December 5, 2017  
INVENTOR(S) : George Horkan Smith and Eric Holley Page 1 of 1

It is certified that error appears in the above-identified patent and that said Letters Patent is hereby corrected as shown below:

In the Claims

In Column 39, Line 33, Claim 3, remove "("UP")" and insert --("UI")--

Signed and Sealed this  
Twenty-eighth Day of May, 2019

Andrei Iancu  
*Director of the United States Patent and Trademark Office*